US011872182B2

(12) United States Patent
Younger

(10) Patent No.: US 11,872,182 B2
(45) **Date of Patent: *Jan. 16, 2024**

(54) CRUTCH

(71) Applicant: Mobility Designed, Inc., Kansas City, MO (US)

(72) Inventor: Max Jefferies Younger, Roeland Park, KS (US)

(73) Assignee: Mobility Designed, Inc., Kansas City, MO (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/158,223

(22) Filed: Jan. 26, 2021

(65) Prior Publication Data

US 2021/0145688 A1 May 20, 2021

Related U.S. Application Data

(63) Continuation of application No. 16/741,134, filed on Jan. 13, 2020, now Pat. No. 10,898,405, which is a (Continued)

(51) Int. Cl.
*A61H 3/02* (2006.01)
*A61H 3/00* (2006.01)

(52) U.S. Cl.
CPC ............. *A61H 3/02* (2013.01); *A61H 3/0277* (2013.01); *A61H 2003/006* (2013.01); *A61H 2003/0227* (2013.01)

(58) Field of Classification Search
CPC ................ A61H 3/02; A61H 2003/006; A61H 2003/0227; A61H 2003/0238; A61H 3/0288
See application file for complete search history.

(56) References Cited

U.S. PATENT DOCUMENTS 3,947,140 A * 3/1976 Thomas .................. A61H 3/02
403/379.5
D258,096 S 2/1981 Barfod
(Continued)

FOREIGN PATENT DOCUMENTS

CN 112155953 A * 1/2021 ............... A61H 3/02
DE 19539963 A1 4/1997
(Continued)

OTHER PUBLICATIONS

Extended European Search Report, dated Oct. 10. 2018, 12 pages, issued in European Application No. 16774360.8.
(Continued)

*Primary Examiner* — David R Dunn
*Assistant Examiner* — Danielle Jackson
(74) *Attorney, Agent, or Firm* — AVEK IP, LLC

(57) ABSTRACT

A crutch includes an arm rest having an elbow end and a front end, the front end defining a front face having a first opening formed therein, and a bottom edge forming a second opening. The crutch has a handle extending outwardly from the front end of the arm rest, but not from the first or second openings. A leg is received into one of the first and second openings in a first configuration, and into the other of the first and second openings in a second configuration. The leg is selectively convertible between the first and second configuration.

20 Claims, 30 Drawing Sheets

Related U.S. Application Data continuation-in-part of application No. 16/127,989, filed on Sep. 11, 2018, now Pat. No. 10,532,001, which is a continuation-in-part of application No. 15/089,048, filed on Apr. 1, 2016, now Pat. No. 10,231,896.

(60) Provisional application No. 62/557,237, filed on Sep. 12, 2017, provisional application No. 62/253,789, filed on Nov. 11, 2015, provisional application No. 62/142,235, filed on Apr. 2, 2015.

(56) References Cited

U.S. PATENT DOCUMENTS

| | | | | |
|---|---|---|---|---|
| 4,248,256 | A * | 2/1981 | Thomas | A61H 3/00 135/71 |
| 4,708,154 | A | 11/1987 | Edwards | |
| 5,193,567 | A * | 3/1993 | Razny, Jr. | A61H 3/02 135/71 |
| 5,301,704 | A | 4/1994 | Evangeline | |
| 5,329,954 | A | 7/1994 | Miyoshi | |
| 5,495,867 | A * | 3/1996 | Block | A61H 3/04 135/65 |
| 5,499,645 | A | 3/1996 | Baliga | |
| 5,555,904 | A | 9/1996 | Stockwell | |
| 5,564,451 | A | 10/1996 | Hagberg | |
| 5,671,765 | A | 9/1997 | Hagberg, Jr. | |
| 5,711,334 | A | 1/1998 | Roux | |
| 5,860,439 | A * | 1/1999 | Ostertag | A61H 3/02 135/71 |
| 6,378,541 | B1 * | 4/2002 | Matthews | A61H 3/02 135/73 |
| 7,104,271 | B2 * | 9/2006 | Larson | A61H 3/02 135/73 |
| 7,434,592 | B2 * | 10/2008 | Larson | A61H 3/0277 482/67 |
| 7,494,138 | B2 | 2/2009 | Graham | |
| 7,610,926 | B2 * | 11/2009 | Adams | A45B 1/00 135/84 |
| 7,621,288 | B2 | 11/2009 | Evans | |
| 8,418,706 | B2 | 4/2013 | Weber | |
| 8,474,470 | B2 | 7/2013 | Albertyn | |
| 8,596,658 | B1 | 12/2013 | Dashew et al. | |
| 8,707,975 | B2 * | 4/2014 | Larson | A61H 3/02 135/84 |
| 8,720,458 | B2 * | 5/2014 | Dickerson, II | A61H 3/02 135/71 |
| 9,032,982 | B2 | 5/2015 | Summit et al. | |
| 9,289,346 | B2 * | 3/2016 | Demski | A61H 3/02 |
| 9,289,347 | B2 | 3/2016 | Powell et al. | |
| 9,532,917 | B2 | 1/2017 | Summit et al. | |
| 9,561,150 | B2 * | 2/2017 | Dickerson, II | A61H 3/02 |
| 9,585,807 | B2 | 3/2017 | Fellingham et al. | |
| 9,682,006 | B2 | 6/2017 | Goldfarb et al. | |
| D799,704 | S * | 10/2017 | Younger | D24/188 |
| 9,801,776 | B2 * | 10/2017 | Larson | A61H 3/0277 |
| D804,675 | S | 12/2017 | Younger | |
| D804,676 | S * | 12/2017 | Younger | D24/188 |
| 10,231,896 | B2 | 3/2019 | Younger | |
| 10,532,001 | B2 * | 1/2020 | Younger | A61H 3/0277 |
| 2004/0020525 | A1 | 2/2004 | Lev | |
| 2007/0256718 | A1 * | 11/2007 | Diaz | A61H 3/02 135/72 |
| 2011/0108075 | A1 | 5/2011 | Weber | |
| 2011/0126872 | A1 | 6/2011 | Albertyn | |
| 2012/0053018 | A1 | 3/2012 | Kaupe | |
| 2013/0247946 | A1 | 9/2013 | Summit et al. | |
| 2013/0319489 | A1 | 12/2013 | Dalury | |
| 2014/0196757 | A1 | 7/2014 | Goffer et al. | |
| 2014/0261594 | A1 | 9/2014 | Salomon | |
| 2014/0265256 | A1 | 9/2014 | Rothstein et al. | |
| 2016/0151229 | A1 | 6/2016 | Varghese et al. | |
| 2016/0287464 | A1 | 10/2016 | Younger | |
| 2020/0146924 | A1 | 5/2020 | Younger | |

FOREIGN PATENT DOCUMENTS

| | | | |
|---|---|---|---|
| ES | 2431414 | A1 | 11/2013 |
| ES | 1216611 | U | 8/2018 |
| JP | H03292956 | A | 12/1991 |
| JP | 2017029335 | A | 2/2017 |
| KR | 20170095773 | A * | 8/2017 |
| WO | 2010017566 | A2 | 2/2010 |
| WO | 2014210495 | A1 | 12/2014 |
| WO | 2016161353 | A1 | 10/2016 |

OTHER PUBLICATIONS

International Search Report and Written Opinion, dated Nov. 7, 2018, 8 pages, issued in Application No. PCT/US2018/050413.
International Search Report, dated Jul. 18. 2016, 2 pages, issued in Application No. PCT/US2016/025684.
Notice of Allowance, dated Oct. 31. 2018. 13 pages, issued in U.S. Appl. No. 15/089,048.
Office Action, dated Oct. 9, 2020, 10 pages, issued in Japanese Application No. 2020-515919.
Extended European Search Report, dated May 10, 2021, 8 pages, issued in European Application No. 188571962.
First Examination Report, dated Mar. 18, 2021, 5 pages, issued in India Applicatien No. 202047015207.

* cited by examiner

CRUTCH

CROSS-REFERENCE TO RELATED APPLICATIONS

This application is a continuation of U.S. patent application Ser. No. 16/741,134, filed Jan. 13, 2020, which is continuation-in-part of U.S. patent application Ser. No. 16/127,989, filed Sep. 11, 2018, which granted as U.S. Pat. No. 10,532,001 and which is a continuation-in-part of U.S. patent application Ser. No. 15/089,048, filed Apr. 1, 2016, which granted as U.S. Pat. No. 10,231,896 and claims priority to U.S. Provisional Patent Application No. 62/142,235, filed Apr. 2, 2015, and U.S. Provisional Patent Application No. 62/253,789, filed Nov. 11, 2015. The '989 Application also claims priority to U.S. Provisional Patent Application No. 62/557,237, filed Sep. 12, 2017. Each of these applications is incorporated by reference herein in its entirety.

BACKGROUND

The crutch is a mobility aid that is widely used throughout the world. Crutches allow the user to support their body weight in the event that the lower extremities of the body are unable to do so. Typically, a crutch is provided for each side of the body, and often are configured to fit beneath the under arms of the user. Handles are located on the crutches, and the user such that, in use, the person's weight is distributed between the under arms, the hands, and the wrists of the user.

There are several disadvantages to traditional crutches. Many people have difficulty coordinating movement with crutches due to the uncomfortable positioning of the crutches at the underarms. Further, the user may quickly become fatigued, and the stress placed on the user's hands and wrists may perpetuate further injury. It would be desirable to have a crutch that allows for an easier transition for the user and that allows the user to make use of his or her elbows and/or upper arms to support the body weight.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, a crutch has a main body having a substantially vertical tubular member with a plurality of apertures formed therein; an angled portion extending upwardly from the substantially vertical tubular member; an arm rest support extending perpendicularly from the angled portion for receiving an arm rest; and a handle extending outwardly from the arm rest support. The crutch further includes a leg telescopically received into the substantially vertical tubular member, and a foot exchangeably received by the leg.

In another embodiment, a crutch includes a main body having a tubular member and an arm rest extending outwardly from the tubular member, and a leg telescopically received by the tubular member, the leg having a foot removably secured thereto. The arm rest has a cradle configured to receive the forearm of a user.

In still another embodiment, a crutch has a main body with a tubular member having a first and second end; an angled portion extending upwardly from the tubular member first end, the angled portion having a hollowed back to form a pocket therein; an arm rest support extending outwardly from the angled portion; and a handle extending outwardly from the arm rest support. A leg is telescopically received at a first end by the tubular member second end; and a foot is removably received by a second end of the leg.

In still yet another embodiment, a crutch comprises a main body, a leg, and a foot. The main body has an arm rest support with a front end and a rear end. The front end has an opening formed in a front face thereof. In addition to the arm rest support, the main body has a handle that extends outwardly from a front end of the arm rest support. The handle does not extend from the opening in the front end. The leg is received in the opening of the front end of the arm rest support, and includes a first angled section and a second substantially vertical section. The first angled section and the second substantially vertical section are of a unitary configuration, or comprise one singular component. The first angled section is received into the opening in the front end. The foot is exchangeably received into the leg.

According to another embodiment, a crutch has a main body, comprising an arm rest support and a handle. The arm rest support has an elbow end, a front end, and a connection point. The connection point end defines a front face having a first opening formed therein. The bottom edge forms a second opening. The handle extends outwardly from a front end of the arm rest support, but does not extend from first or second openings. The crutch further comprises a leg operably connected to the main body. In a first configuration, the leg is received into one of the first and second openings. In a second configuration, the leg is received into the other of the first and second openings. The leg is selectively convertible between the first and second configuration.

In still yet another embodiment, a crutch has a main body and a leg. The main body has an arm rest support with a front end and a rear end. The front end defines a front face with an opening formed therein. A bottom edge of the main body forms a second opening. An arm rest is hingedly connected to the rear end of the arm rest support. A leg is operably connected to the main body. In a first configuration, the leg is received into one of the first and second openings. In a second configuration, the leg is received into the other of the first and second openings. The leg is selectively convertible between the first and second configuration.

According to a further embodiment, a crutch has an arm rest that includes an arm rest support, a front end having a first and a second opening formed therein, and a rear end opposing the front end. A handle extends outwardly from the front end of the arm rest, but does handle does not extend from the first and second openings in the front end. A leg is selectively received into one of the first and second openings in the front end of the arm rest. The first opening in the front end extends along a horizontal axis substantially parallel with the arm rest, and the second opening in the front end extends along a generally vertical axis, the generally vertical axis intersecting the horizontal axis at the front end of the arm rest.

According to yet another embodiment, a crutch includes an arm rest having an elbow end and a front end, the front end defining a front face having a first opening formed therein, and a bottom edge forming a second opening. The crutch has a handle extending outwardly from the front end of the arm rest, but not from the first or second openings. A leg is received into one of the first and second openings in a first configuration, and into the other of the first and second openings in a second configuration. The leg is selectively convertible between the first and second configuration.

According to still yet another embodiment, a crutch has an arm rest having a front end and a rear end, the front end having a first opening formed in a front face thereof, and a second opening formed at a bottom edge thereof. A handle extends outwardly from a front end of the arm rest support. A leg is included, and has a cap at one end defining a key. Each of the first and second openings define a keyed opening corresponding to the cap. In a first configuration, the leg is received into one of the first and second openings. In a second configuration, the leg is received into the other of the first and second openings. The leg is selectively convertible between the first and second configuration. A projection extending from a lever in the arm rest protrudes into a first hole defined in the leg when the leg is in the first configuration and into a second hole defined in the leg when the leg is in the second configuration. The lever is actuated by a user to convert the leg between the first and second configurations.

DETAILED DESCRIPTION

Figure 1:
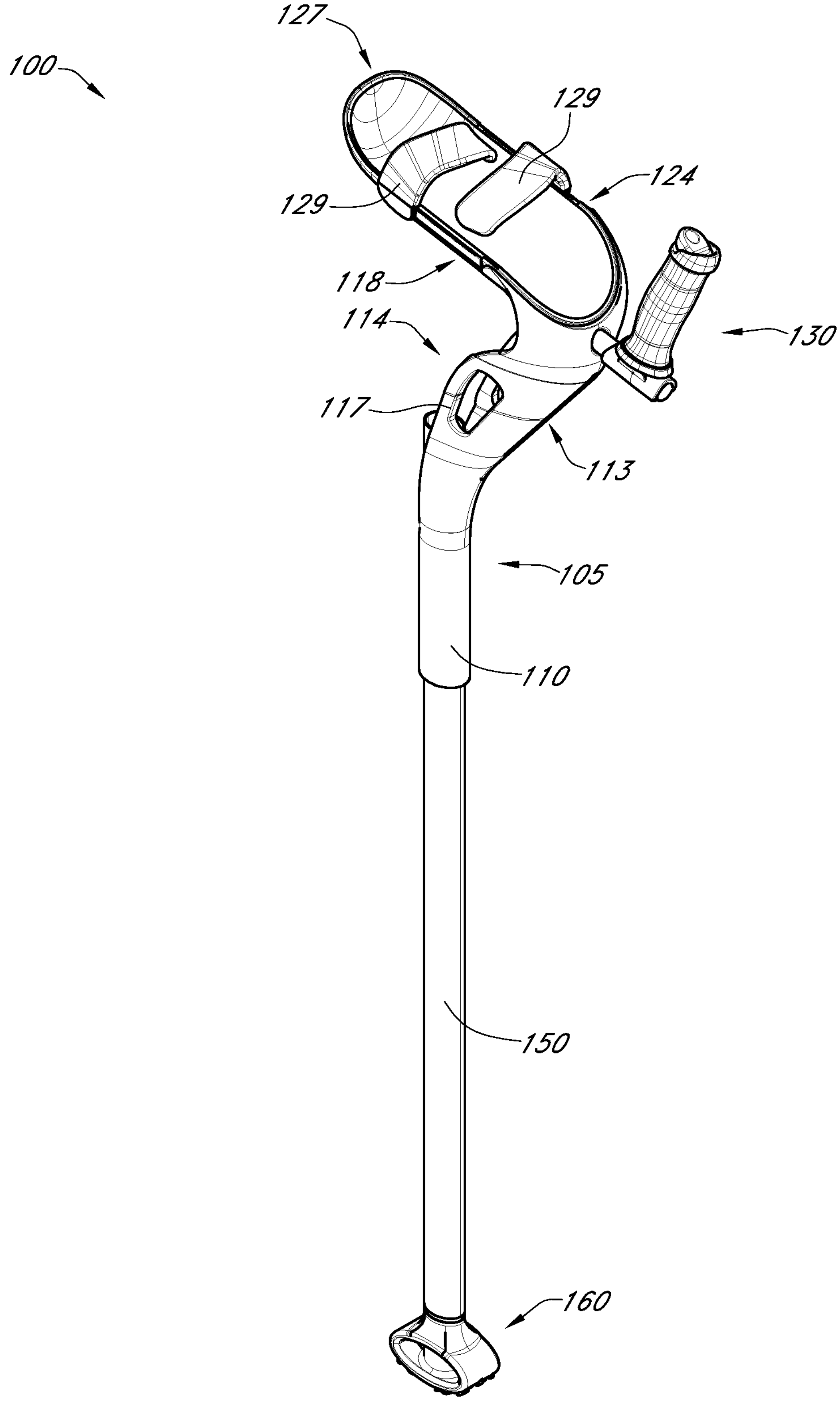
FIG. 1 is a perspective view of a crutch according to one embodiment of the invention.

Embodiments of crutches are disclosed herein. In one embodiment, illustrated by FIGS. 1-6, a crutch 100 has a main body structure 105 and a leg 150 attached to an interchangeable foot 160 for contacting the ground. The main body 105 may include a substantially vertical tubular member 110 leading to a first angled portion 113 which extends upwardly at an angle to a second oppositely angled portion 115 leading to an arm rest support 118 having a handle 140 extending therefrom.

Figure 4:
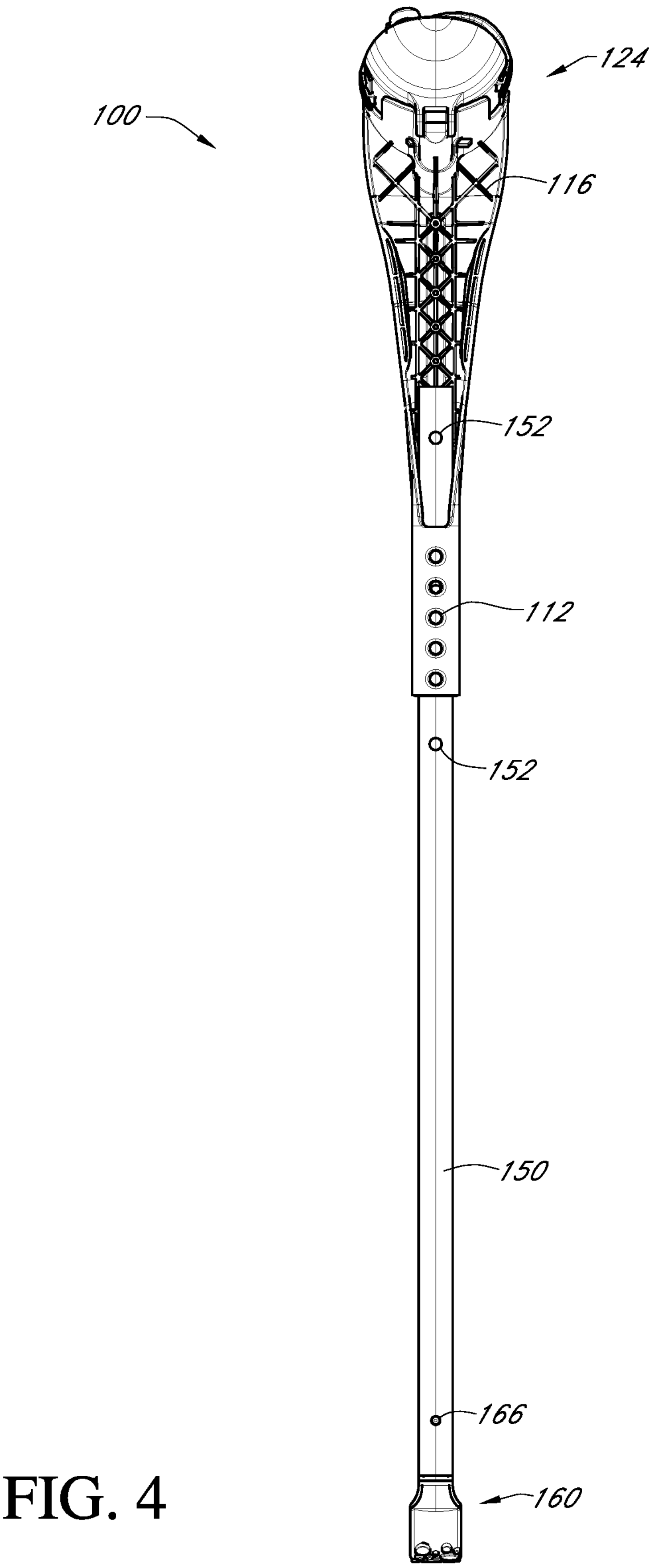
FIG. 4 is a rear view of the crutch according to the embodiment of FIG. 1.
Figure 5:
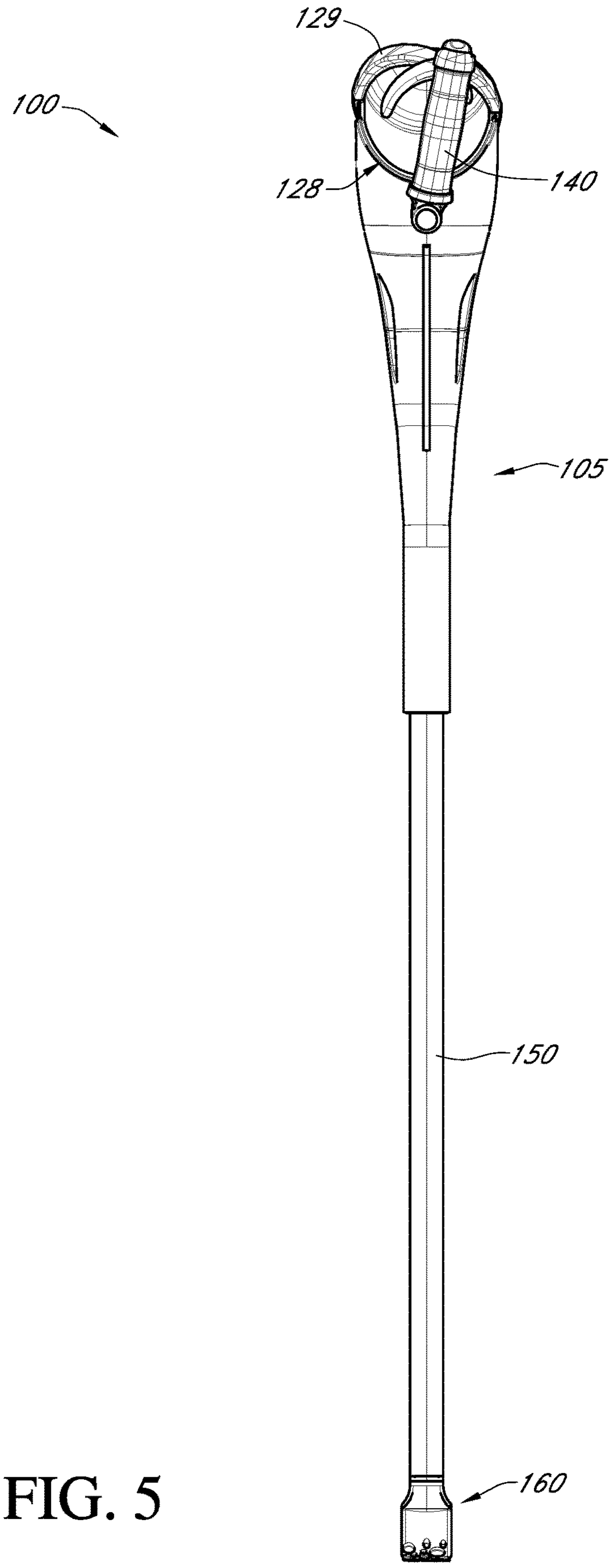
FIG. 5 is a front view of the crutch according to the embodiment of FIG. 1.
Figure 6:
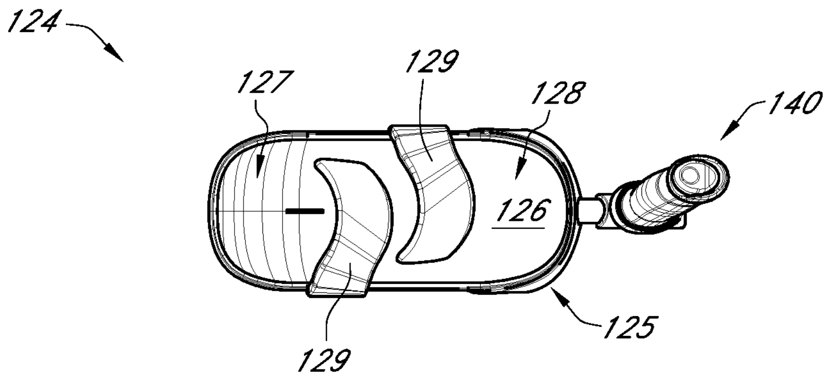
FIG. 6 is a top view of the crutch according to the embodiment of FIG. 1.

Referring to FIGS. 1 and 4, the main body vertical tubular member 110 may be hollow in order to receive the leg 150. As is described in greater detail below, the leg 150 may be equipped with a mechanical fastening mechanism, such as a quick release button, which may engage with apertures 112 formed in a backside of the vertical tubular member 110.

The vertical tubular member 110 extends upwardly toward the first angled portion 113, which extends upwardly in a forward direction at a predetermined angle between 0 and 90 degrees relative to horizontal. The first angled portion 113 may also be hollowed, forming a void 116 therein. The void 116 may be used, for example, as a pocket for storing a user's valuables, such as a keys or a cell phone, or may be equipped to hold other personal items such as a water bottle. To prevent the contents of the pocket 116 from slipping, and to minimize movement within the pocket 116, the pocket 116 may be equipped with a rubber (or other similar material) coating. Additionally, handles 117 may be formed into the sides of the angled portion 113 for ease of carrying the crutch 113.

The first angled portion 113 is so designed in order to provide the crutch 100 with shock absorbing capabilities. As the user relies on the crutch 100 and a portion of the user's body weight is transferred to the crutch 100, and the angled portion 113 is allowed to flex slightly such that the angled portion 113 absorbs a portion of the force, transferring the transferred force away from the user's arms, hands, and/or under arms. Ribs 116, illustrated in FIG. 4, may be formed or placed around the interior surface of the angled portion

113 to provide reinforcement to the angled portion 113 and strength to the main body 105. Although not shown in the drawings, covers may be provided to snap (or otherwise attach) to the main body 105 to cover the ribs 116.

Figure 2:
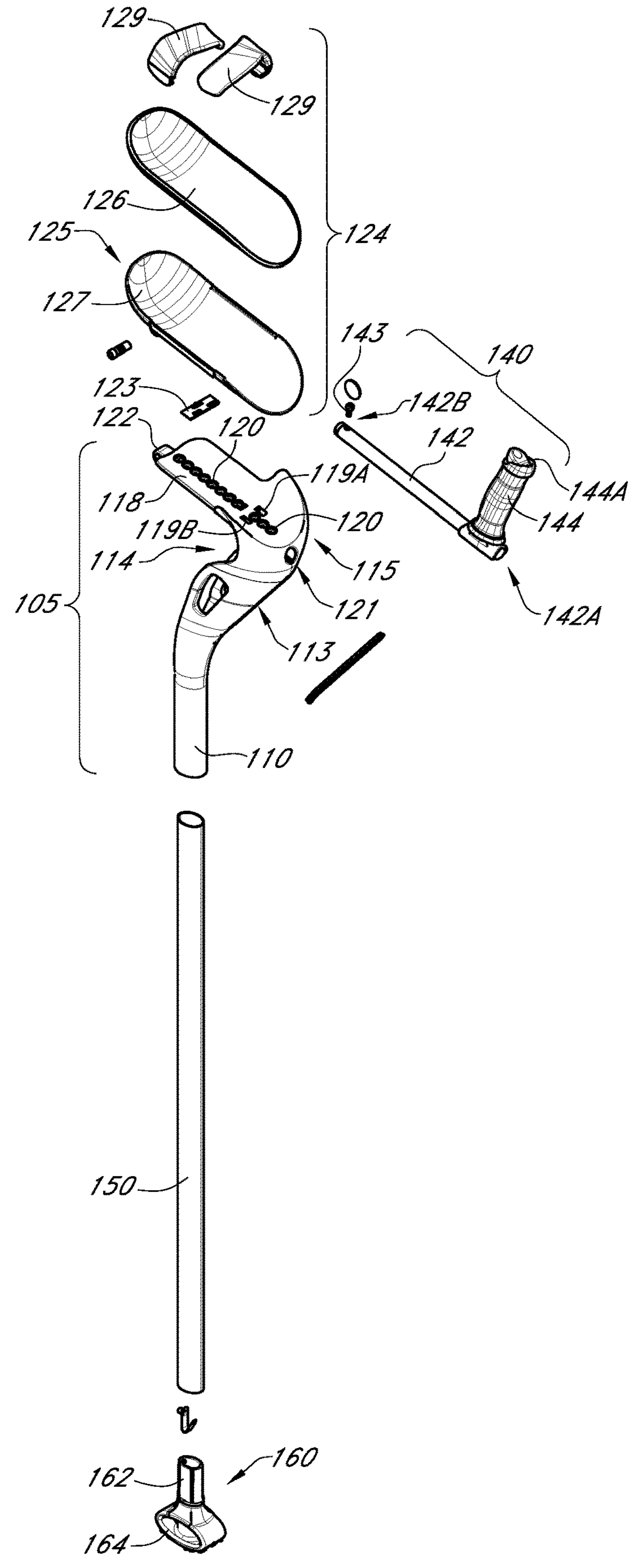
FIG. 2 is an exploded perspective view of the crutch according to the embodiment of FIG. 1.
Figure 3:
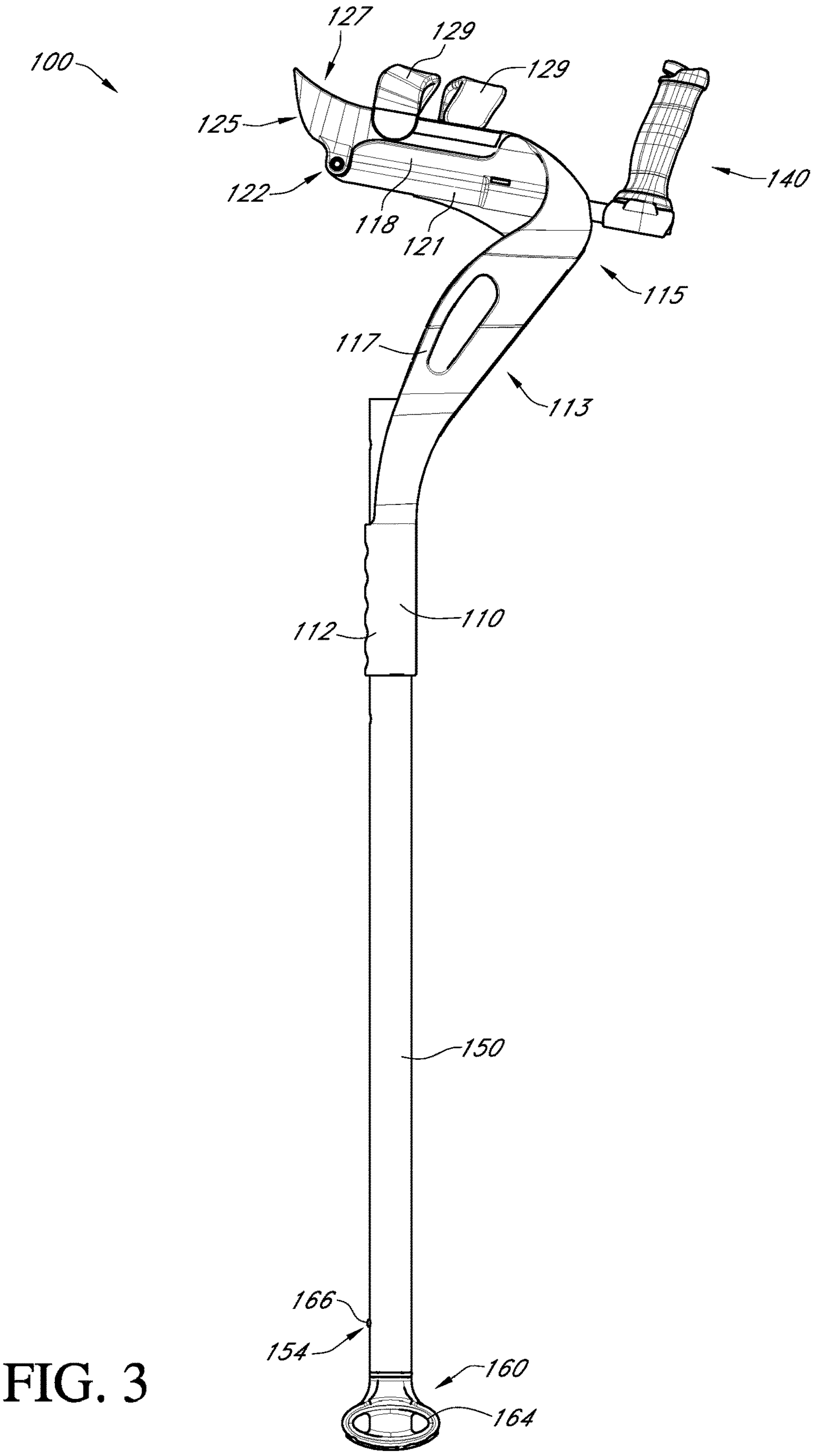
FIG. 3 is a side view of the crutch according to the embodiment of FIG. 1.

Moving on, and as described above, the first angled portion 113 extends upwardly to the second angled portion 115, which extends outwardly therefrom to form the arm rest support 118. As illustrated in FIGS. 2-3, the arm rest support 118 may be configured to engage with an arm rest 124. The arm rest 124 may include a cradle 125 configured to receive the user's forearm. Accordingly, the cradle 125 may include a first end comprising an elbow cup 127 for receiving the user's elbow, and a second open end 128 opposite the elbow cup 127, allowing the user's arm to extend outwardly therefrom. As described in greater detail below, bracing 129 may be provided and secured at positions along the outer edges of the cradle 125.

Figure 3A:
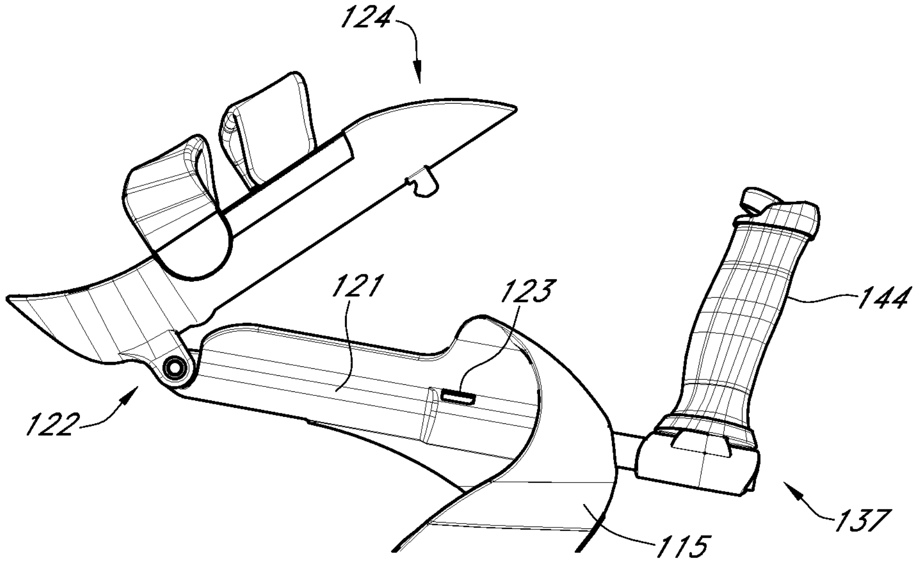
FIG. 3A is a side view of the crutch showing the arm rest cradle in an open position.
Figure 3B:
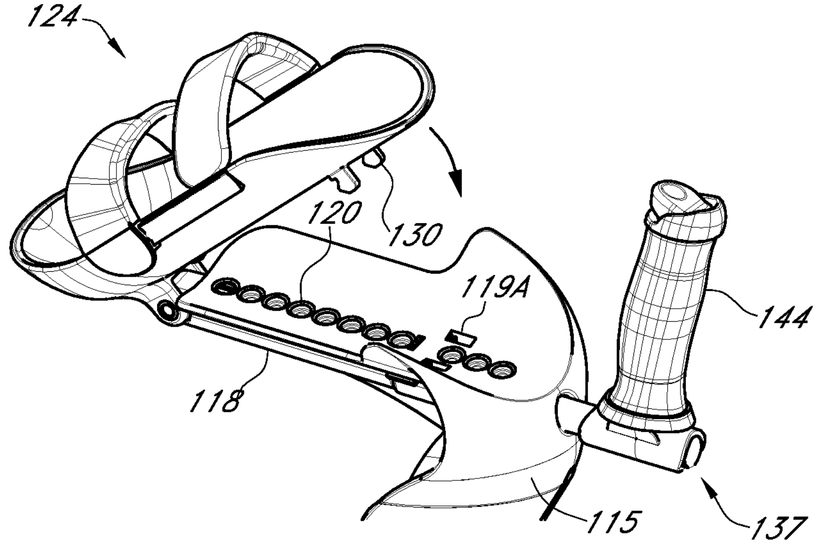
FIG. 3B is a top perspective view of the crutch of FIG. 3A.

Referring now to FIGS. 3, 3A, and 3B, in one embodiment, the cradle 125 may be hingedly connected to the arm rest support 118 via hinged connection 122. The cradle 125 may pivot about the hinged connection 122 as shown in FIGS. 3A and 3B. Teeth 130 may be provided along an underside of the cradle 125, which may engage with apertures 119A, 119B formed into the arm rest support 118. The cradle 125 may be secured to the arm rest support 118 via a sliding lock 123, for example, to prevent the cradle 125 from unexpectedly or undesirably detaching from the arm rest support 118.

In another embodiment, the cradle 125 and the arm rest support 118 may have a unitary configuration.

In one embodiment, the arm rest support 118 may be held at a fixed position approximately 0 to 15 degrees relative to horizontal. Accordingly, the arm rest 124 may also be held at a position approximately 0 to 15 degrees relative to horizontal.

Padding 126, such as a foam insert, may be provided in the cradle 125 to provide maximum comfort and impact absorption. In embodiments, the padding 126 may extend over the sides of the cradle 125. Here, the padding 126 may provide a friction interface between the cradle 125 and a surface upon which the crutch 100 may rest against. Foams of varying densities may be used depending on the user's specific requirements and comfort. Moreover, multiple layers of foam and/or other padding may be used to pad the cradle 125. It may be desirable for the padding 126 to be hydrophobic and/or antimicrobial to resist sweat and microbial growth. Fabric may additionally be provided for comfort. The elbow cup 127 may further include a gel pocket, either separately or embedded in the foam liner in order to provide extra padding, as the elbow cup 127 may receive the majority of the user's weight. In one embodiment, the padding 126 may be constructed of a first layer of single density foam, a gel pocket encapsulated at the area of the elbow cup 127, and a second layer of antimicrobial fabric.

The padding 126 may be removable such that the user can switch out the liners. Accordingly, the padding 126 may be secured to the cradle 125 via an adhesive (e.g., double sided tape, Velcro, etc.) or a mechanical attachment (e.g., snaps, hooks, etc.). Those of skill in the art will recognize that it may be beneficial for the padding 126 to have perforations to promote airflow.

Optionally, an upper arm sleeve may be attached to the back of the elbow cup 127. The upper arm sleeve may provide stability to the crutch 100 when in use. The upper arm sleeve may be allowed to flex in order to support the user's upper arm to still permit natural movement of the user's arm. In one embodiment, the upper arm sleeve may include first and second arms, positioned on either side of the cradle 125, and attached thereto with a spring loaded hinge or other appropriate mechanical fastening mechanism. A band may be secured to the free ends of the arms, and may be configured to wrap partially or completely around the user's upper arm. The spring loaded hinge may bias the upper arm sleeve in the direction of the user's arms. In use, the user's arms may overcome the force of the spring to bias the upper arm sleeve in the opposite direction. Accordingly, the upper arm sleeve may be configured to maintain constant contact with the user's upper arms.

The arm rest 124 may further be equipped with bracing 129 to maintain the user's arms in the cradle 125. The bracing 129 may include straps secured at one end to respective positions along either side of the cradle 125, the other end extending at least partially over the cradle 125. To allow for personalized positioning of the bracing 129, apertures (such as those shown in FIG. 8 at 331) may be formed along either or both sides of the length of the cradle 125 to serve as the connection point for the bracing 139. Various fastening mechanisms may be employed on one end of the straps to secure the bracing 129 to the cradle 125, such as snaps, rivets, screws, etc. Alternately, a t-bar slot may be formed along the outer edge of the cradle 125, and the straps may be equipped with a respective t-bar to engage with the t-bar slot. Those of ordinary skill in the art may recognize that the t-bar slot/t-bar fastening mechanism may allow the user the most flexibility in choosing the best position for the bracing 129.

The bracing 129 may be configured to restrain the user's arm while in normal use with the crutch 100, but to allow for a quick release of the user's arm when necessary. Accordingly, the bracing 129 may be constructed of a flexible plastic, or other flexible material. One exemplary material is ethylene vinyl acetate (EVA), which can be easily molded according to the size and shape of the user's arm. To mold EVA bracing 129, the user may place the individual straps into boiling water to make the EVA malleable. Then, the straps may be bent to the desired shape.

In another embodiment, the device may additionally, or alternately, utilize Velcro or other similar straps to secure the user's arms in the cradle 125. Other exemplary bracing mechanisms may include the use of rigid (e.g., hard plastic) straps in a hinged connection with the cradle 125, such as those shown in FIGS. 3A and 3B. Respective rigid straps may be located opposite each other on either side of the cradle 125, or on a single side of the cradle 125, and extend partially over the cradle 125. A gap may be provided between rigid straps extending from either side of the cradle 125 to allow the user to break free of the straps.

Those of skill in the art may recognize that the apertures (e.g., 331) formed in the cradle 125 may provide additional or alternative benefits to the user. For example, specially designed hooks, clips, trays, containers, or other accessories may be attached to the crutch 100, allowing the user to carry objects that he or she would otherwise not be able to carry, such as a purse or bag, grocery basket, food tray, pot of water, laundry basket, beverage, phone, etc.

Moving on, as briefly described above, the handle 140 extends outwardly from the arm rest support 118. The handle 140 may include an extension member 142 a gripping portion 144. The extension member 142 may be, for example, a telescoping rod having a proximal end 142B configured to engage with a channel 121 formed in the underside of the arm rest support 118, and a distal end 142A. To provide the most comfortable and natural fit, it may be beneficial for the channel 121 to be offset from the center of the arm rest support 118 by approximately 0 to 25 degrees. To customize the length of the extension member 142, the extension member 142 may be equipped with one or more quick release buttons (or other appropriate locking device) for engaging with respective openings 120 (FIGS. 2 and 3B) which may be formed along a length of the arm rest support 118 corresponding to the channel 121. To position the extension member 142, the user (or a person aiding the user) may disengage the locking device from the opening 120 in the channel 121. The extension member 142 may then be moved in the desired direction until the locking device on the extension member 142 engages with the desired opening 120. This process may be repeated until the handle 140 is at the desired distance.

Alternatively, the gripping portion 144 may be equipped with a length adjustment mechanism (e.g., button 144A) that releases the extension member 142 from its engagement with the channel 121 in order to move the extension member 142 to the desired position. In one embodiment, the button may be connected to a cable mechanism that may engage an element connected to a locking pin to move the handle 140 to the correct position for the user.

The gripping portion 144 may be secured to, and extend perpendicularly from, the extension member distal end 142A at an angle between approximately 0 and 15 degrees relative to vertical. In one embodiment, the gripping portion 144 may be secured to the extension member 142 via a bracket 136. In another embodiment, the gripping portion 144 may be secured via one or more hinges 137 or ball joint (e.g., FIG. 3A) for maximum rotation. The handle 140 may be configured to tilt along the x-z plane (e.g., toward and away from the user) and rotate about the y-z plane (e.g., left and right of the user). A button (e.g., button 144A) may be provided on the handle gripping portion 144 to release the hold of the gripping portion 144 on the extension member 142. Thus, to rotate the gripping portion 144 about the extension member 142, for example, the user may press the button 144A and move the gripping portion 144 to the desired position.

In some embodiments, the handle 140 may include an inner structural core, and an outer portion. The core may be formed of any appropriate material, including but not limited to steel, aluminum, iron, et cetera. The outer portion may be formed of any appropriate material, such as plastic. In some embodiments, the outer portion is configured to wrap around the core. For example, the outer portion may be formed of two opposing pieces that snap together around in the core. In other embodiments, the outer portion may be formed around the core by co-molding, for example.

Additional embodiments of the handle 140 may alternately be realized to provide additional or alternative benefits to the user. Various mechanisms may lock the handle 140 in the desired position. In one embodiment, the grip 144 may and extension member 142 may be equipped with respective threading. To move the grip 144, the grip 144 may be "unscrewed" and rotated into the desired position, and then rotated in the opposite direction to lock the grip 144 in place.

Referring now to FIG. 4, the leg 150 telescopically engages with the substantially vertical tubular member 110 of the main body 105. Accordingly, the leg 150 may be equipped with one or more quick release connectors 152 (or other appropriate fastening mechanism) which may interact with corresponding apertures 112 formed in the substantially vertical tubular member 110. The quick release connectors 152 may be provided at various positions along the leg 150 (e.g., at the top of the leg 150, near the middle of the leg 150, etc., as shown in FIG. 4) to allow for maximum height adjustment.

To change the position of the leg 150, the quick release connector 152 may be pressed in by the user (or the person aiding the user) and the leg 150 moved in and out of the tubular member 110 until the desired height is reached. For transporting purposes, it may be desirable for the leg 150 to be inserted as far as possible into the tubular member 110 to minimize the footprint of the crutch 100.

As shown in the figures, the foot 160 may extend from the leg 150 and may be configured to provide a means for efficiently and comfortably contacting the ground. Typically, a person's foot moves in a heel-to-toe manner when walking. However, prior art crutches often come with a rubber end that is perfectly flat. While the rubber allows for some flexibility to move with the person, the natural tendency of the foot is to be completely flat on the ground.

Figure 9:
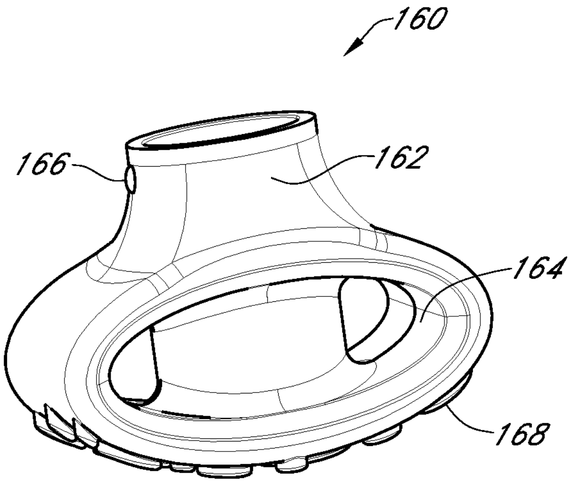
FIG. 9 is a close up perspective view of a foot according to an embodiment of the invention.

In one embodiment, illustrated in FIG. 9, the foot 160 may include a neck 162 having at least one mechanical fastener (such as a quick release connector 166) formed thereon, and a hollowed annular member 164 extending downwardly from the neck 162. The neck 162 of the foot 160 may be received into the end of the leg 150 such that the mechanical fastener 166 engages with an aperture 154 formed in the leg 150 to secure the foot 160 thereto. Therefore, it shall be understood that the foot 160 may be interchangeable.

The foot 160 may be formed of flexible plastic, such as acrylonitrile butadiene styrene (ABS), which may allow for slight compression of the annular member 164 of the foot 160 as forced is placed on the crutch 100, thereby providing additional shock-absorption benefits. Different strength materials may alternatively be utilized in order to accommodate a range of weights. Due to the annular nature of the foot 160, the crutch 100 may move in a more natural way across the ground, as the foot 160 may be able to emulate the movement of a human's foot as it travels across the ground.

The hollowed annular member 164 may be covered with treading 168 for gripping. Since the foot 160 may be interchangeable due to the ability to remove the foot 160 from the end of the leg 150, various feet may be provided, each being configured for a specific situation. For example, there are different tread styles that are beneficial depending on the weather. Therefore, one interchangeable foot 160 may be equipped with a tread design suitable for everyday use. Other interchangeable feet 160 may be for indoor use, use in the rain, ice and/or snow. Additionally, other types or shapes of feet may also be desirable. For example, there may be situations in which an off-the-shelf crutch foot may be desirable. Furthermore, carbon-fiber feet may be desirable where the user wishes to use the crutches 100 in an athletic manner. Still further types of feet that may be incorporated onto the crutch 100 include a tripod or a quad foot which may increase the stability of the crutch 100.

In another embodiment, to provide further traction, an opening may be formed in the bottom rim of the hollowed annular member 164, and the top rim of the hollowed annular member 164 may be equipped with a pin. As the user walks, the force of the user's weight on crutch 100 may cause the foot 160 to compress slightly, causing the pin to protrude through the opening, and into the ground. It may be understood that a foot 160 having a pin would not be desirable on hard surfaces, such as concrete or asphalt.

In one embodiment, the foot 160 may be equipped with a cover that slides into place over the foot 160 upon activation of a trigger. The trigger may be located, for example, on the handle 140 of the crutch 100, and the user may activate the trigger, causing the cover to move into place over the foot 160. The trigger may then be pushed again to move the cover off the foot 160, or to separate the cover from the foot 160 entirely.

Figure 7:
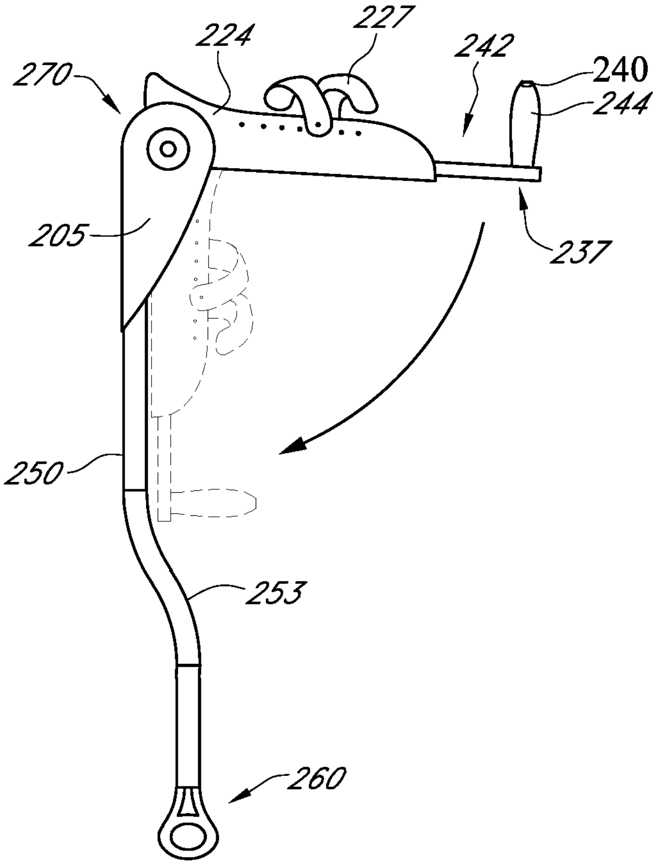
FIG. 7 is a side view of a crutch according to another embodiment of the invention.

FIG. 7 illustrates another embodiment of a crutch 200 which is substantially similar to embodiment 100 except as shown and/or described herein, or as would be inherent. Further, those skilled in the art will appreciate that the embodiment 100 (and thus embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199, though with any noted or described deviations.

In embodiment 200, the arm rest 224 may be pivotally connected to the main body 205 and/or the leg 250 via a hinged connection 270. The arm rest 224 may thus be rotatable from about 0 to 135 degrees relative to horizontal, as illustrated. To accommodate the degrees of rotation of the arm rest 224, the main body 205 may be modified such that an opening is formed therein to receive the arm rest 224. Further, the leg 250 may include an angled portion 253, as shown, to provide shock absorbing benefits to the crutch 200. Accordingly, the leg 250 may be formed from any material sufficient to allow the leg 250 to slightly flex and subsequently return to its original position.

The crutch 200 may be configured such that a button, for example, on the handle 240, allows the user to easily change the position of the arm rest 224. This may be particularly useful when the user is, for example, ascending or descending stairs.

Figure 8:
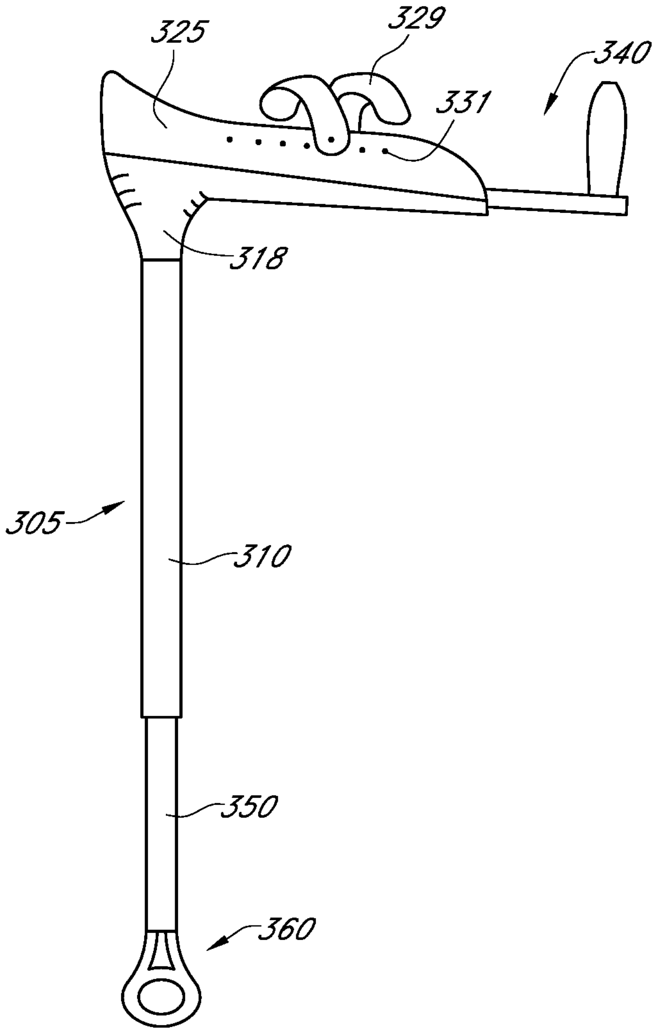
FIG. 8 is a side view of a crutch according to still another embodiment of the invention.

FIG. 8 illustrates another embodiment of a crutch 300 which is substantially similar to embodiment 100 except as shown and/or described herein, or as would be inherent. Further, those skilled in the art will appreciate that the embodiment 100 (and thus embodiment 300) may be modified in various ways, such as through incorporating all or part of any of the various described embodiments, for example. For uniformity and brevity, reference numbers between 300 and 399 may be used to indicate parts corresponding to those discussed above numbered between 100 and 199, though with any noted or described deviations.

In embodiment 300, the leg 350 may be a single straight leg tube. The main body 305 may include a single substantially vertical tubular member 310 for interacting with the leg 350, and an arm rest support 318. The arm rest support 318 may be fixed to the substantially vertical tubular member 310 at an angle of between approximately 0 to 15 degrees relative to horizontal. A cradle 325 may be received into the arm rest support 318, and a handle 340 may extend from the arm rest support 318 as described above.

Figure 10:
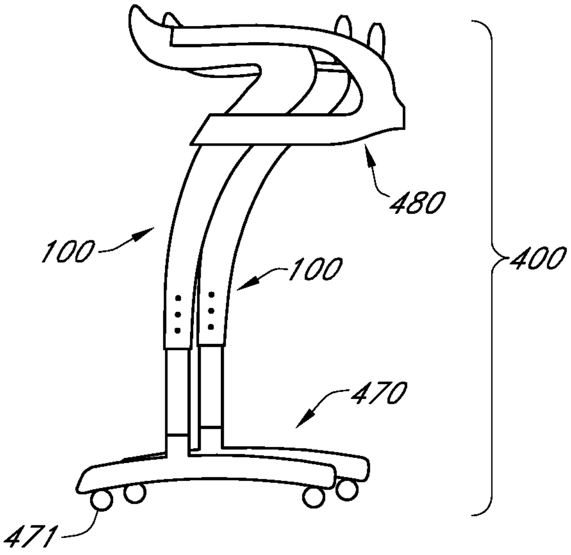
FIG. 10 is a perspective view of two crutches secured together to form a walker according to an embodiment of the invention.
Figure 11:
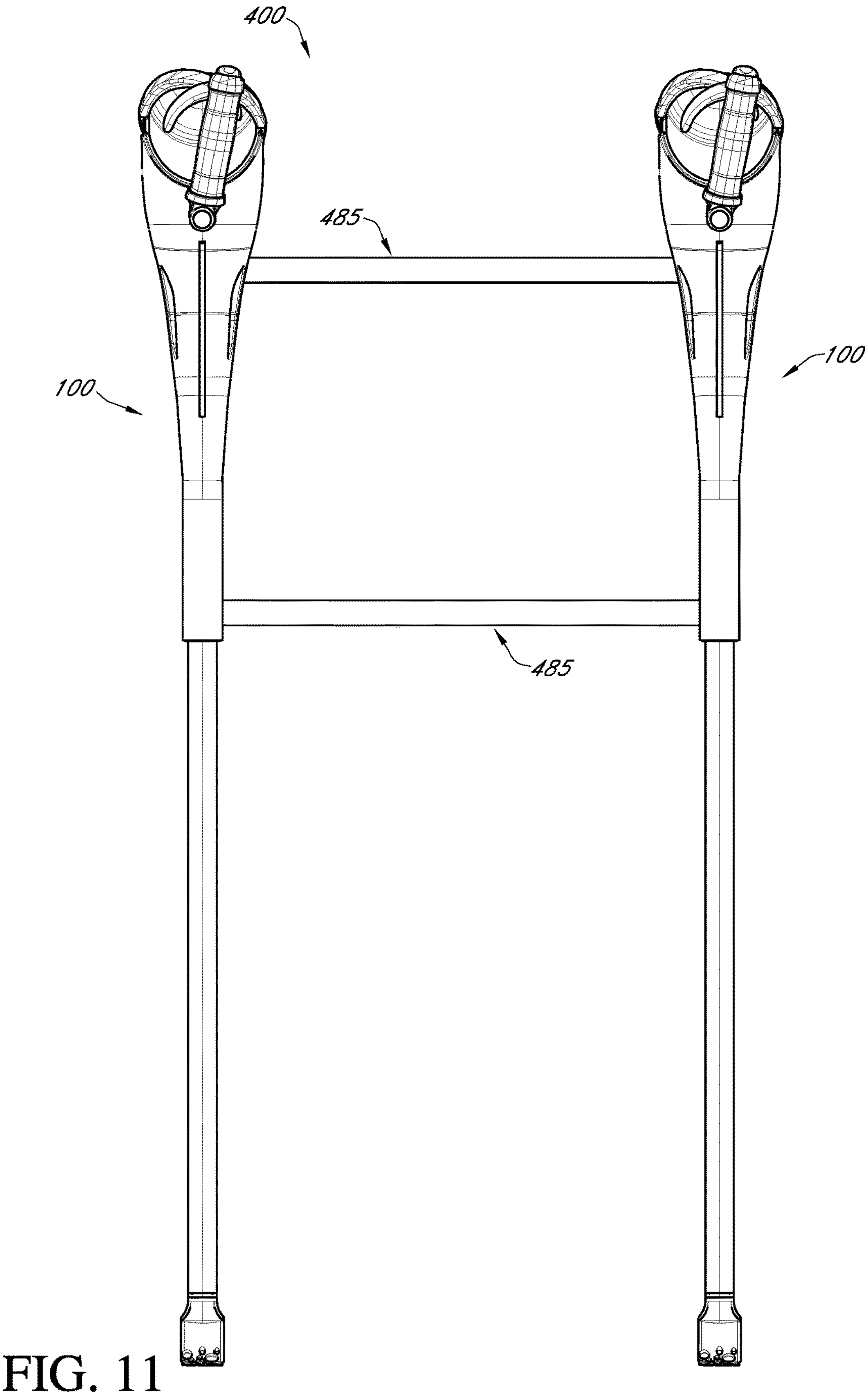
FIG. 11 is a front view of the embodiment of FIG. 10.

FIGS. 10 and 11 illustrate another embodiment 400, comprising two or more crutches as described herein to form a walker. For ease of reference, the walker 400 is described with reference to the use of crutches according to the embodiment 100. However, it shall be understood that any of the crutches 100, 200, 300 described herein may alternately, or additional be incorporated into embodiment 400 as appropriate.

In embodiment 400, two crutches 100 may be fastened together to form a walker 400. Here, the crutches 100 may be attached together via a bracket 480 (FIG. 10). The bracket 480 may be secured to each of the respective crutches 100 with a mechanical fastener, such as a screw. Alternately, each individual crutch 100 may be equipped with means for receiving an end of a structural rod member 485. The crutches 100 may be placed in parallel positions, and the structural rod member 485 may be received by the crutches 100 and secured in position to form the walker 400. To provide stability, the feet 470 of the crutches 100 may be elongated. In another embodiment of the walker 400, not shown, the walker 400 may include four crutches 100, secured together via brackets 480 and/or structural rod members 485 in an open square configuration. Small casters 471 may additionally be placed in the corners (e.g., at the ends of the elongated feet, at each foot, etc.) for increased maneuverability.

Various additional devices may also be incorporated into each crutch 100, 200, 300, and 400. For example, a pedometer may be housed inside the device (for example, in the main body 105) to track activity levels. The pedometer may be in wireless communication with, for example, a smart phone or other tracking device. Other electronic modules or multipurpose modulus may be included to measure and provide information on other physiological parameters, such as blood-pressure and heart-rate monitors, as well as means for tracking number of calories burned. Still additional metrics that may be tracked include speed, points of stress, number of minutes the crutch is used per day, et cetera. The data may be relevant for developing tools for managing the user's health and for maximizing the life of the crutch.

Further, each crutch 100 may be equipped with a means for snapping, locking, or otherwise attaching pairs of crutches 100 together for ease of carrying the crutches 100. In one embodiment, magnets may be provided in the main body 105 of each crutch 100 such that, when positioned together, the crutches 100 stick together. In another embodiment, a first crutch 100 may be equipped with a hook, and a second crutch 100 equipped with means for engaging with the hooks, such that the crutches 100 may be attached for easy transportation. Other attachment means may additionally, or alternately, be appropriate for connecting individual crutches together.

Reference is now made to FIGS. 12-19, illustrating alternative embodiments of a crutch 500 which is substantially similar to embodiment 100 except as shown and/or described herein, or as would be inherent. Further, those skilled in the art will appreciate that the embodiment 100 (and thus embodiment 500) may be modified in various ways, such as through incorporating all or part of any of the various described embodiments, for example. For uniformity and brevity, reference numbers between 500 and 599 may be used to indicate parts corresponding to those discussed above numbered between 100 and 199, though with any noted or described deviations.

The crutch 500 includes a main body 505, a leg 550, and a foot 560. Similar to the main body 105, the main body 505 includes an arm rest support 518, an arm rest 524 having a cradle 525 comprising an elbow cup 527. The arm rest 524 is optionally rotatably attached to the arm rest support 518 at a hinged connection 522. Bracing 529 extends over the cradle 525 to keep the user's arm in position within the cradle 525. A handle 540 extends from the arm rest support 518.

Here, however, the main body 505 has a lower profile in comparison to the higher-profile main body 105. Where the main body 105 includes a substantially vertical tubular member 110 and an angled portion 113 extending from a portion of the main body 105, the main body 505 is truncated at a connection point **507*a*. The connection point 507*a* is positioned away from the handle 540 towards the elbow cup 527. The connection point 507*a* includes first and second openings 511 and 512, respectively. The first opening 511**

(FIG. 15) is formed into a bottom edge 508 of the connection point 507*a*. The second opening 512 may be formed into a front face 509 of the connection point 507*a*. The openings 511 and 512 are configured to receive the leg 550 as described in greater detail below.

Figure 15:
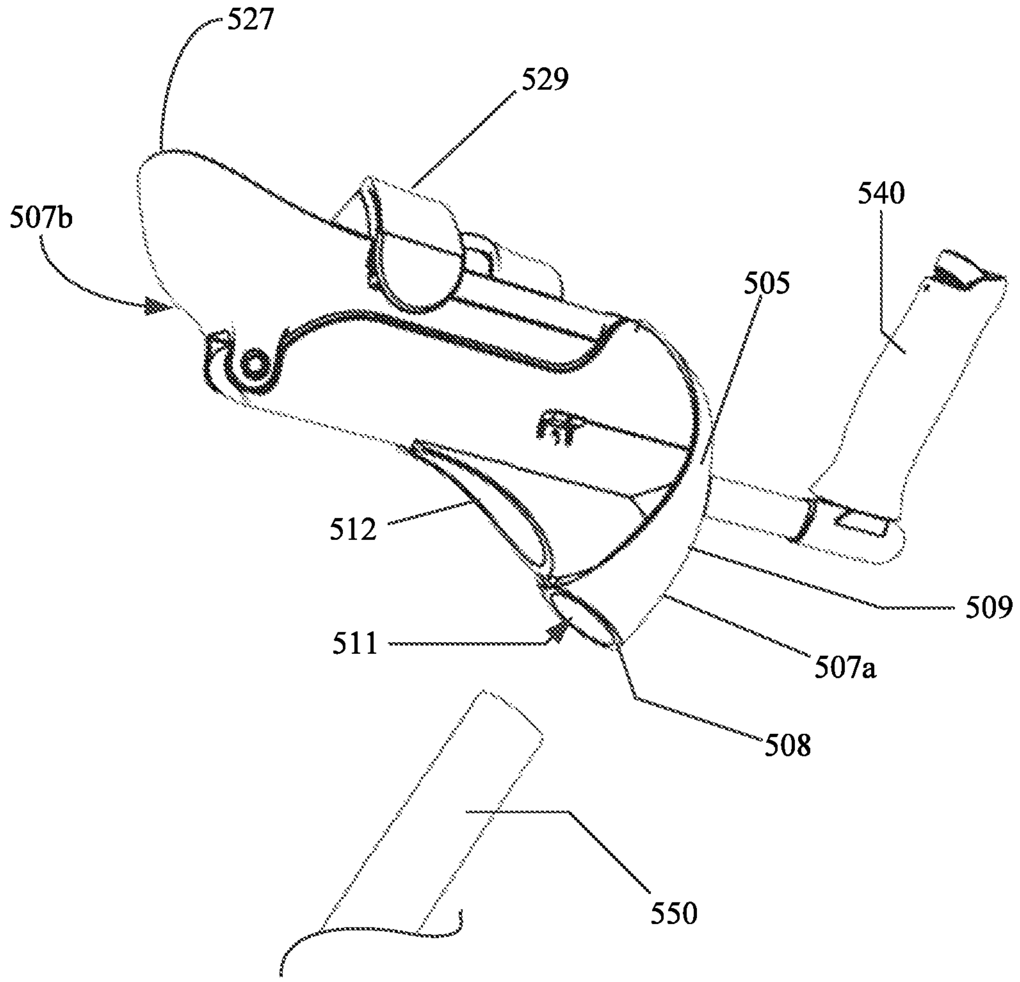
FIG. 15 is a close up expanded view of the main body portion of FIG. 14.

Additionally, a back end 507*b* of the main body, comprising the elbow cup 527, may be cut out, e.g., in a half-moon shape (FIG. 15). The cutout provides clearance for the user's arm in the event that the user's arm is extended. Accordingly, the user's elbow may be comfortably extended such that the user's arm is straightened while the user's forearm is maintained in position within the cradle 525. As mentioned above, the bracing 529 which extends over the cradle 525, keeps the user's arm in position within the cradle 525. Optionally, the bracing 529 may funnel inward in the direction of the handle 540.

Figure 12:
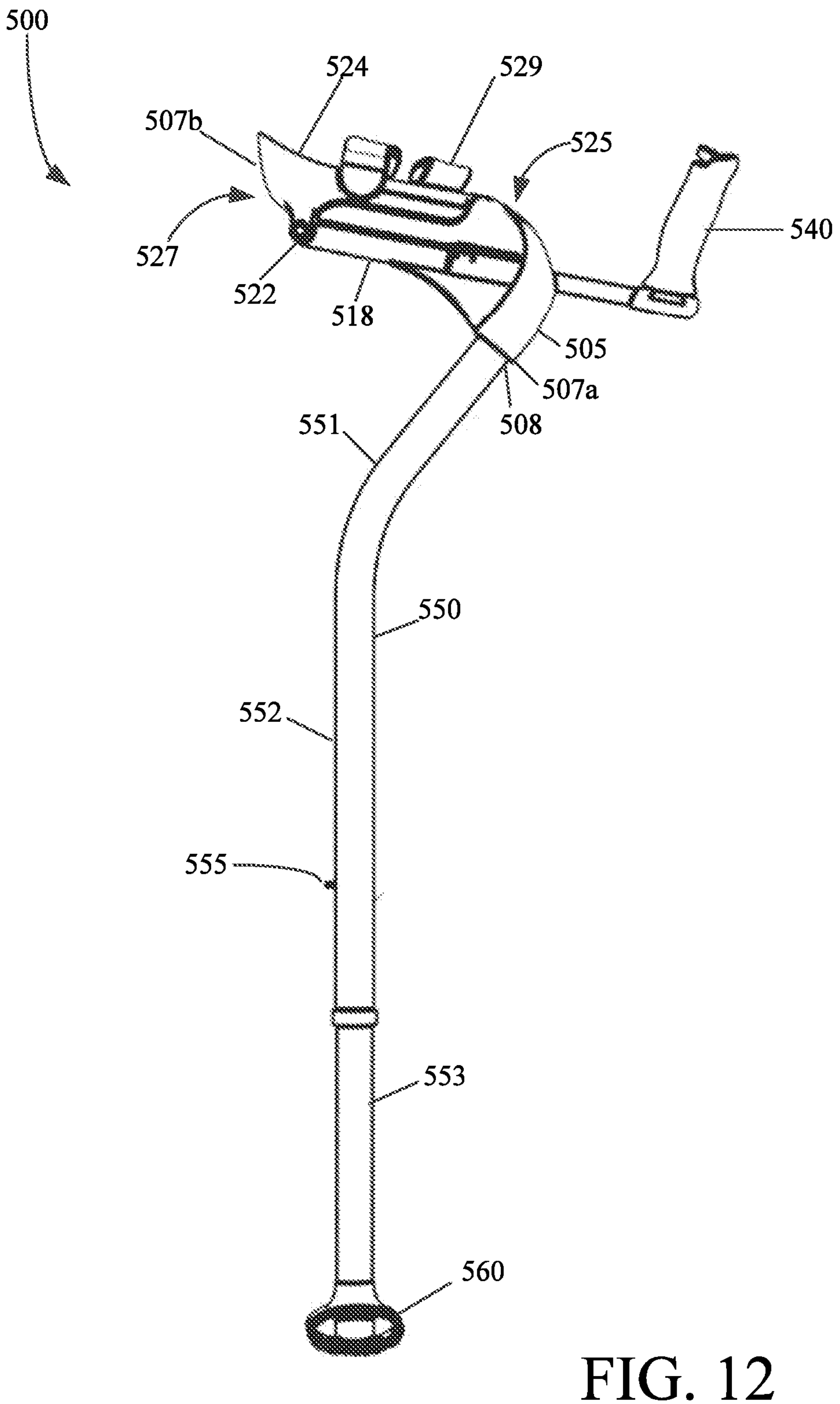
FIG. 12 is a side perspective view of a crutch according to another embodiment of the invention, the crutch being in a first configuration.
Figure 13:
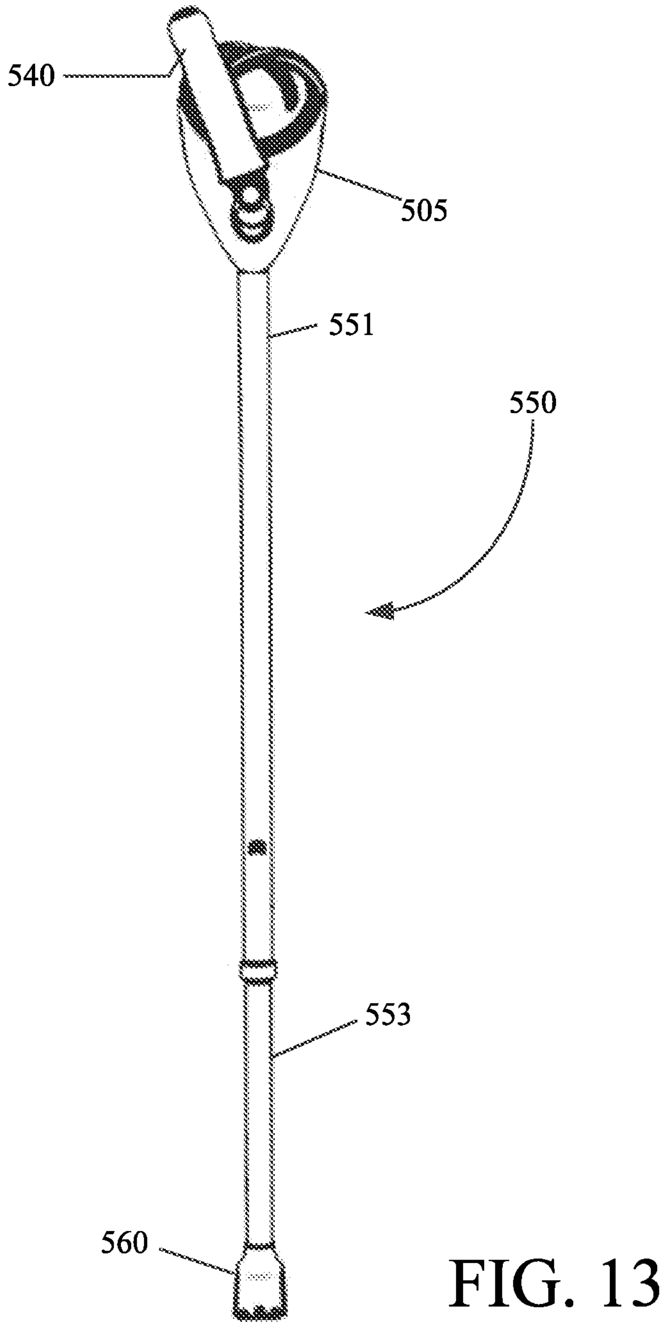
FIG. 13 is a front view of the crutch of FIG. 12.

Moving on, the leg 550 optionally includes a first angled section 551 and a second vertical section 552, as shown in at least FIG. 12. The first and second sections may have a unitary configuration (i.e., are integrally formed of a single material). Optionally, the second vertical section 552 is configured to receive a third section 553 which may be, but need not be, separate from the first and second sections 551 and 552 respectively. The third section 553 may include a quick release connector 555 (similar to quick release connector 152). The quick release connector 555 may engage with apertures formed in the second vertical section 552 to lengthen and shorten the crutch 500 as needed by the user.

The first angled section 551 may be angled between about 0 and 45 degrees from vertical. In an embodiment, the angle may be about 15 degrees from vertical. In one embodiment, the angle in the first angled section 551 may be in a front-to-back orientation, as seen in FIG. 12.

Figure 14:
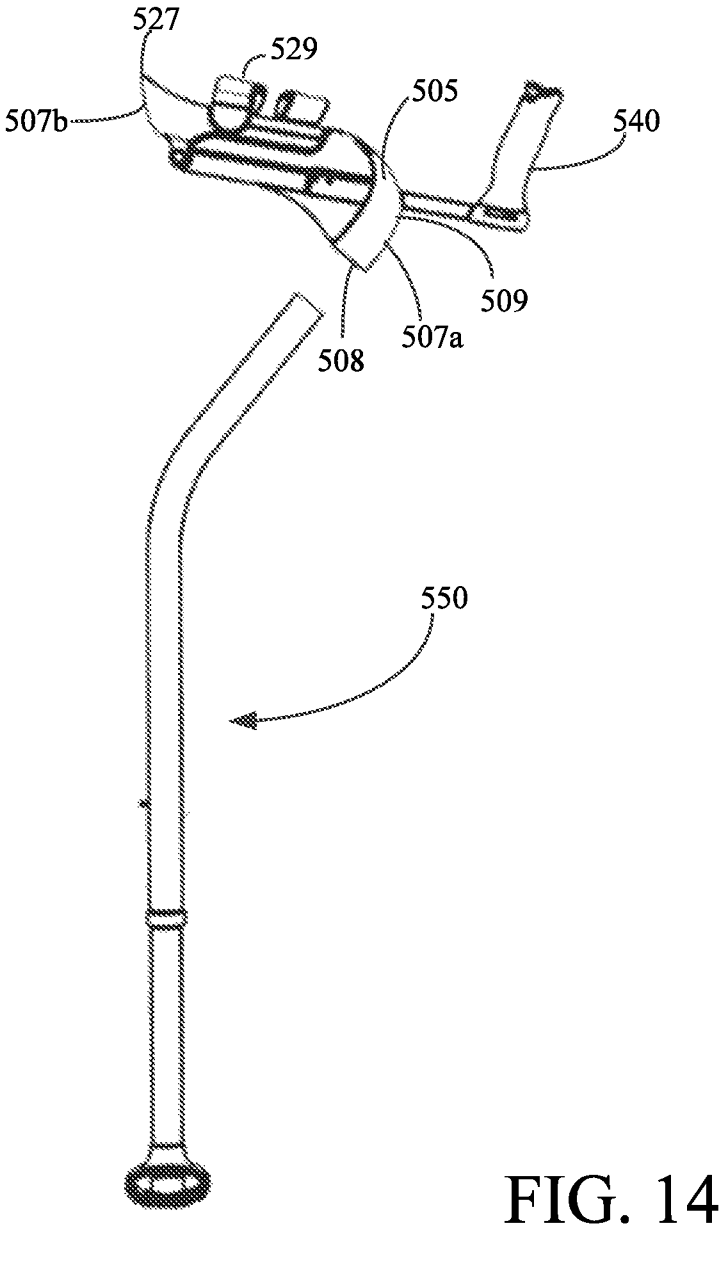
FIG. 14 is an expanded view of the crutch of FIG. 12.

As shown in FIGS. 15-19, the leg 550 engages with the main body 505 via the openings 511 and 512. In a first configuration, illustrated in FIGS. 14-15, the leg 550 is inserted into the opening 511. Here, the leg 550 is inserted into the opening such that the first angled section 551 is angled toward the handle 540, and the second vertical section 552 is substantially vertically linear with the back end 507*b* of the main body 505, as shown in FIG. 14. When the leg 550 is inserted into the opening 511 as described, the main body 505 is substantially parallel to the ground, as illustrated in FIG. 12.

Figure 16:
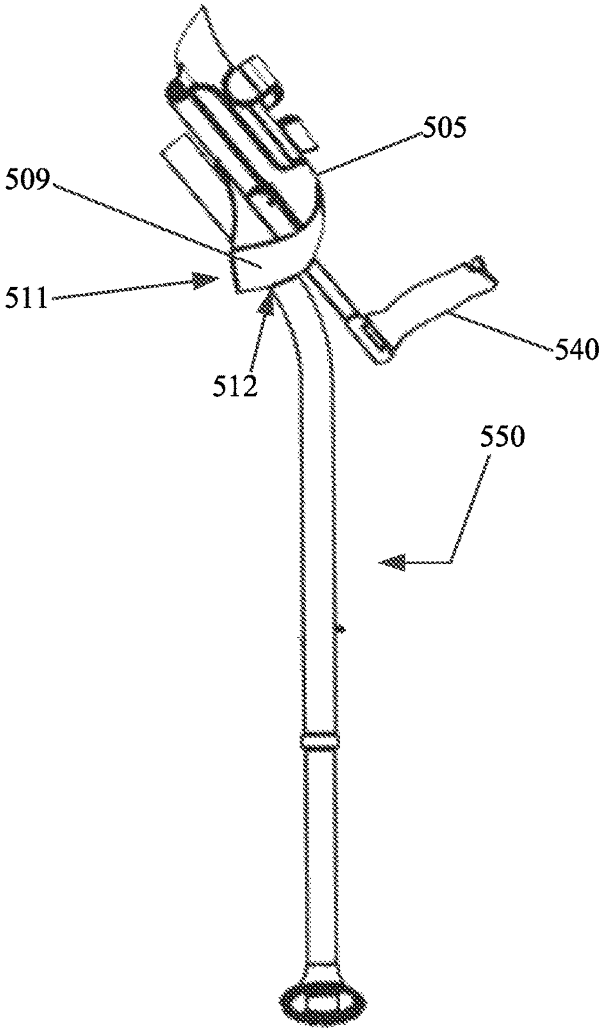
FIG. 16 is a side perspective view of the crutch of FIG. 12 in a second configuration.
Figure 17:
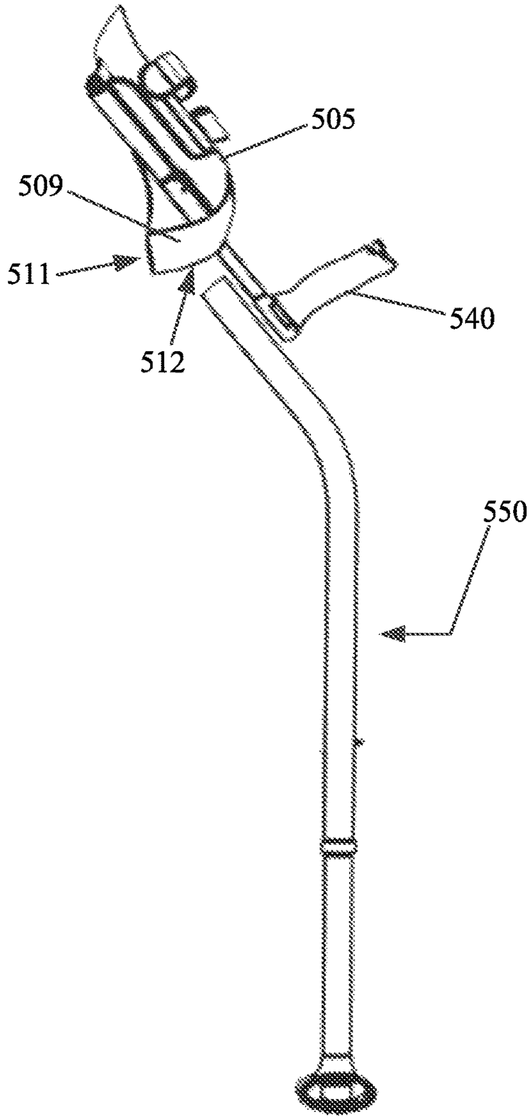
FIG. 17 is an expanded view of the crutch of FIG. 16.
Figure 18:
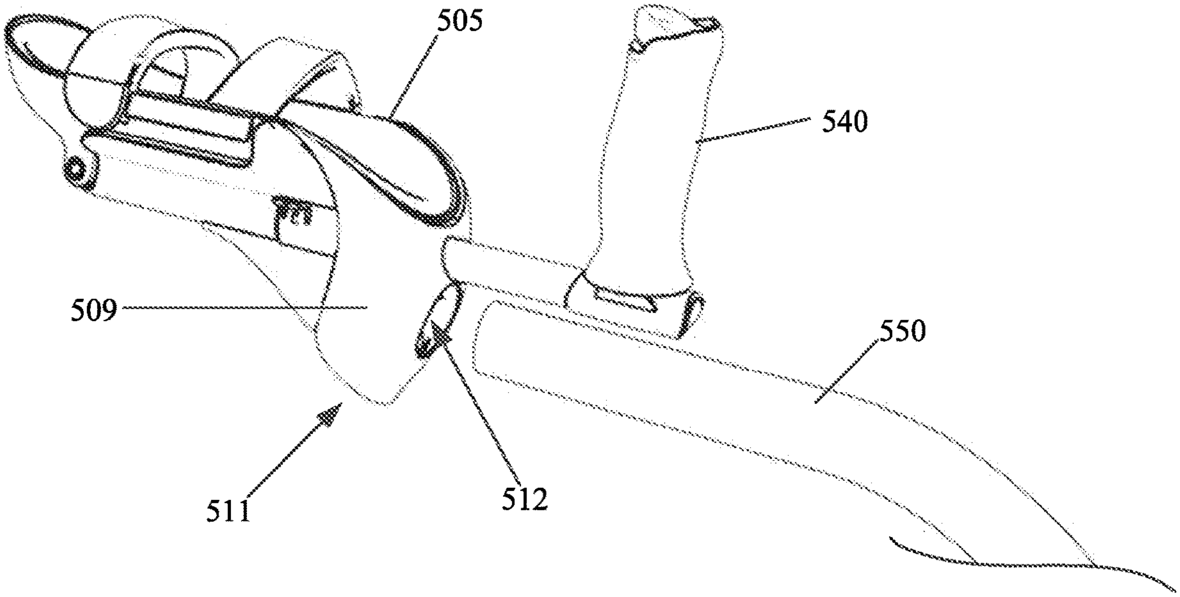
FIG. 18 is a rotated, close up expanded view of the main body of the crutch of FIG. 16.
Figure 19:
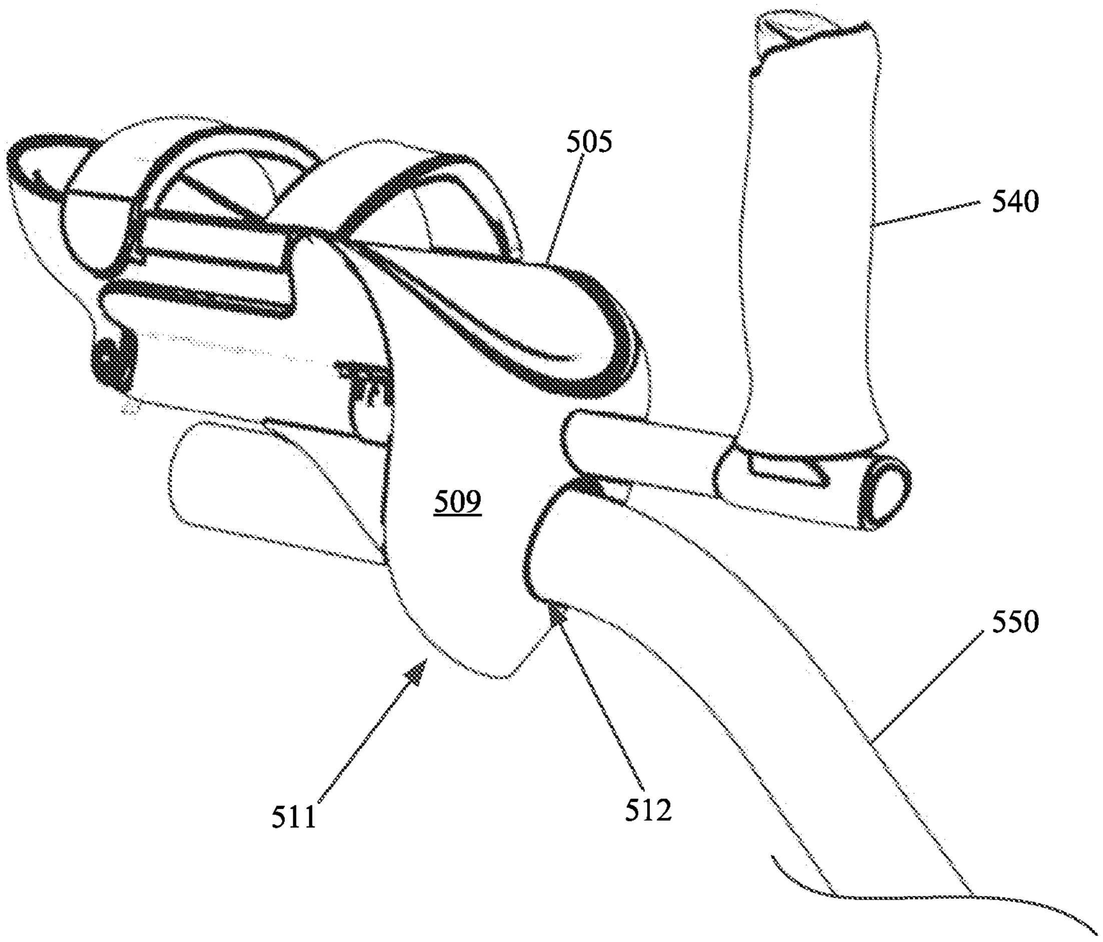
FIG. 19 is a rotated, close up view of the main body of the crutch of FIG. 16.

Referring now to FIGS. 16-19, in a second configuration, the leg 550 is inserted into the opening 512. Here, the leg 550 may be rotated in order to insert it into the opening 512. When the leg 550 is engaged with the opening 512, the main body 505 is angled downward towards the ground surface, as shown in FIG. 16.

In instances, it may be desirable for the user to switch from the first configuration to the second configuration or vice versa. In order to move from the first configuration to the second configuration, the user may simply remove the leg 550 from the respective opening 511 or 512, position the leg 550 around such that the angle of the leg 550 is appropriate for the desired position of the main body 505, and insert the leg 550 into the other opening 512 or 511. When the user changes the configuration of the crutch 500, the user completely removes the leg 550 from contact with the main body 505. Contact is then reestablished when the leg 550 is reinserted into the desired opening 511 or 512.

The legs 550 may include one or more quick-release connects (or other mechanical faster) to engage with a respective aperture 511 or 512 in the main body 505 to maintain the respective leg 550 in position. The openings 511 and 512 may include a locking mechanism, such as a quick release connector, gasket, a lever-locking mechanism, or the like, for maintaining the main body 505 in position on the leg 550. In embodiments, the leg 550 has the locking mechanism which engages with corresponding structure on the main body 505 to maintain the main body 505 in connection therewith. In one embodiment, the legs 550 may be held in position via a frictional fit with the respective opening 511 or 512. Optionally, the leg 550 is equipped with structure, e.g., a cap, an angled ramp, which operably interfaces with the locking mechanism on the main body 505 to secure the leg 550 to the main body 505. In one embodiment, the main body 505 comprises a single quick-release connect that engages with the leg 550 when the leg 550 is inserted into either the opening 511 or the opening 512. Corresponding openings in the leg 550 ensure that the leg 550 is correctly inserted. For example, an opening in a first side of the leg 550 may engage with the quick-release connect when the leg 550 is inserted into opening 511. An opening in a second side of the leg 550 (e.g., opposite the first side) may engage with the quick-release connect when the leg 550 is inserted into the opening 512. The openings in the respective first and second sides of the leg 550 need not be on the same horizontal plane.

Figure 20:
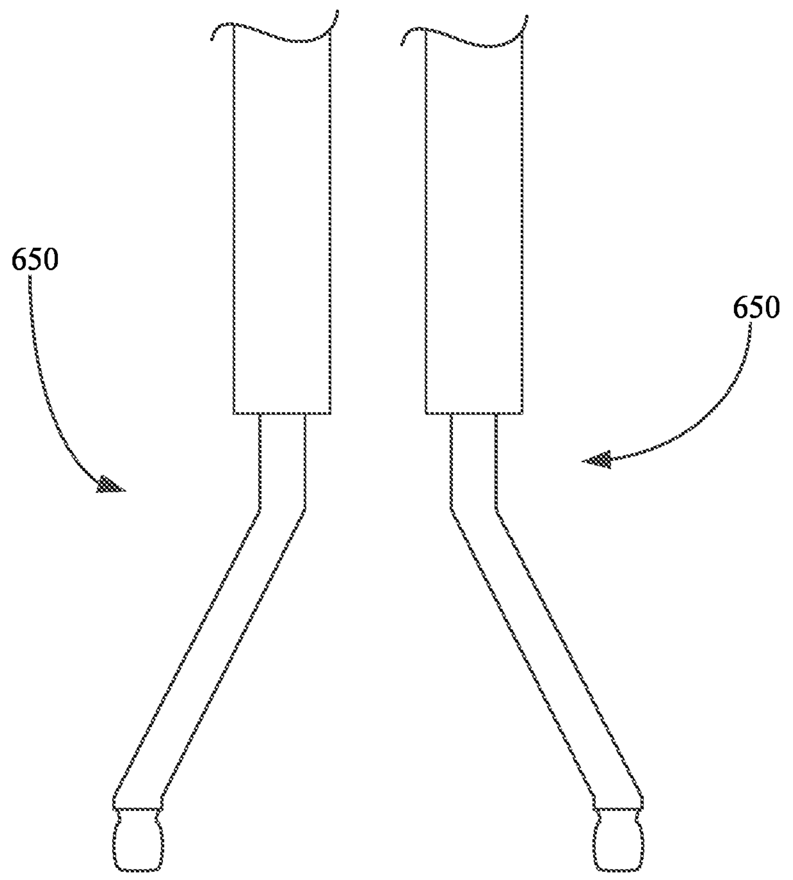
FIG. 20 is a front view of the legs of a crutch according to yet another embodiment of the invention.

FIG. 20 illustrates a set of legs 650 angled in a side-to-side orientation. In an embodiment, the legs 650 may be curved or otherwise oriented away from a center point of the user. The angle here allows the respective legs 650 to provide additional support to the user, as the legs 650 extend away from the side of the user's body. Additionally, the configuration maintains the user's arms in a comfortable position near the body, while the legs 650 of the crutch 500 provide the support. The legs 650 may additionally include an angled portion similar to angled portion 551 to allow the main body 505 to attach to the legs 650 as described herein. Alternately, the legs 650 may be used with the main body 105. Here, the legs 650 may include a substantially vertical portion to which the main body 105 attaches similar to embodiment 100 as described herein. However, the legs 650 may be angled as shown in order to provide increased stability to the user.

Moving on, FIGS. 21-31 illustrate alternative embodiments of a crutch 700 which is substantially similar to embodiment 500 except as shown and/or described herein, or as would be inherent. Further, those skilled in the art will appreciate that the embodiment 500 (and thus embodiment 700) may be modified in various ways, such as through incorporating all or part of any of the various described embodiments, for example. For uniformity and brevity, reference numbers between 700 and 799 may be used to indicate parts corresponding to those discussed above numbered between 500 and 599, though with any noted or described deviations.

Figure 30:
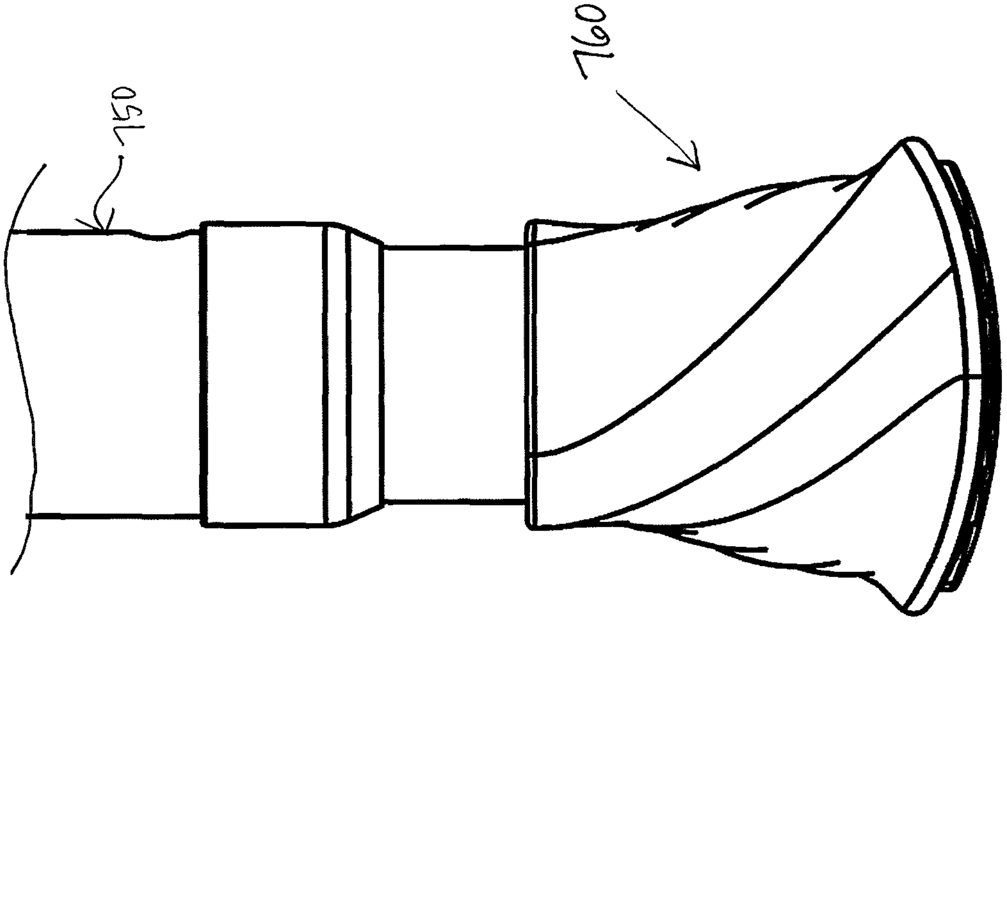
FIG. 30 is a side view of a foot of the crutch of FIG. 21.
Figure 31:
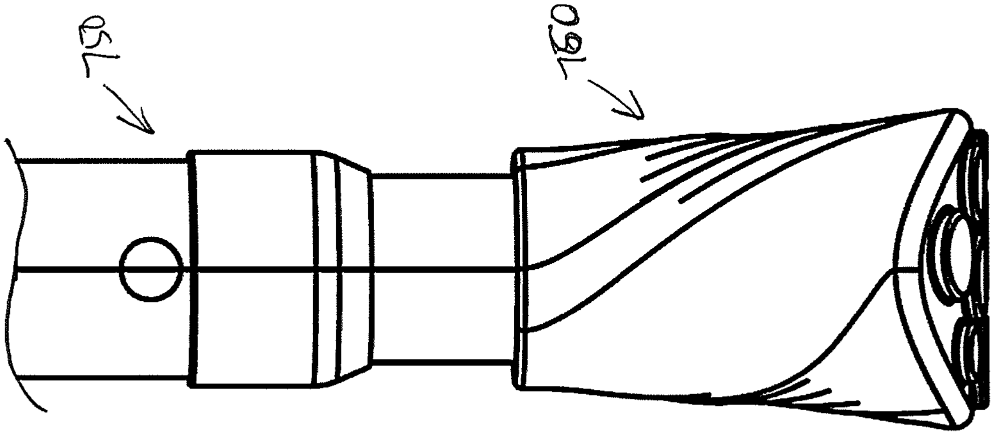
FIG. 31 is a front view of the foot of the crutch of FIG. 21.

Like embodiment, 500, the crutch 700 includes a main body 705, a leg 750, and a foot 760 (FIGS. 30-31). Similar to the main body 505, the main body 705 includes an arm rest support 718 having a cradle 725 comprising an elbow cup 727. Bracing 729 extends over the cradle 725 to keep the user's arm in position within the cradle 725. A handle 740 extends from the arm rest support 718.

As with the main body 505, the main body 705 has a lower profile in comparison to the higher-profile main body 105. The main body 705 has a connection point 707*a*, comparable to the connection point 507*a*. The connection point 707*a* is positioned away from the handle 740 towards the elbow cup 727. The connection point 707*a* includes first and second openings 711 (best seen in FIGS. 26 and 27) and 712 (best seen in FIG. 22), respectively. The first opening

711 is formed into a bottom edge 708 of the connection point 707*a*. The second opening 712 may be formed into a front face 709 of the connection point 707*a*. The second opening 712 may extend through the main body 705 in a substantially linear manner, concluding in an opening 712*b* in a back face 709*b* of the main body 705 opposing the opening 712 formed in the front face 709. The leg 750 can therefore pass through the opening 712 at the front face 709, and subsequently out the opening 712*b* in the back face 709*b*. The openings 711 and 712 are configured to receive the leg 750 as described in greater detail below.

Here, the openings 711 and 712 (and opening 712*b*) are defined by a plurality of teeth 730 (e.g., anti-rattle teeth) formed around the perimeter of the respective opening 711, 712, 712*b*. An inside diameter of the openings 711, 712, and 712*b* may be slightly smaller than an outer diameter of the leg 750. When the leg 750 is received into a respective opening 711 or 712 (and 712*b*), the teeth 730 are sufficiently flexible to allow the leg 750 to enter, yet provide a friction fit between the leg 750 and the main body 705.

Figure 24:
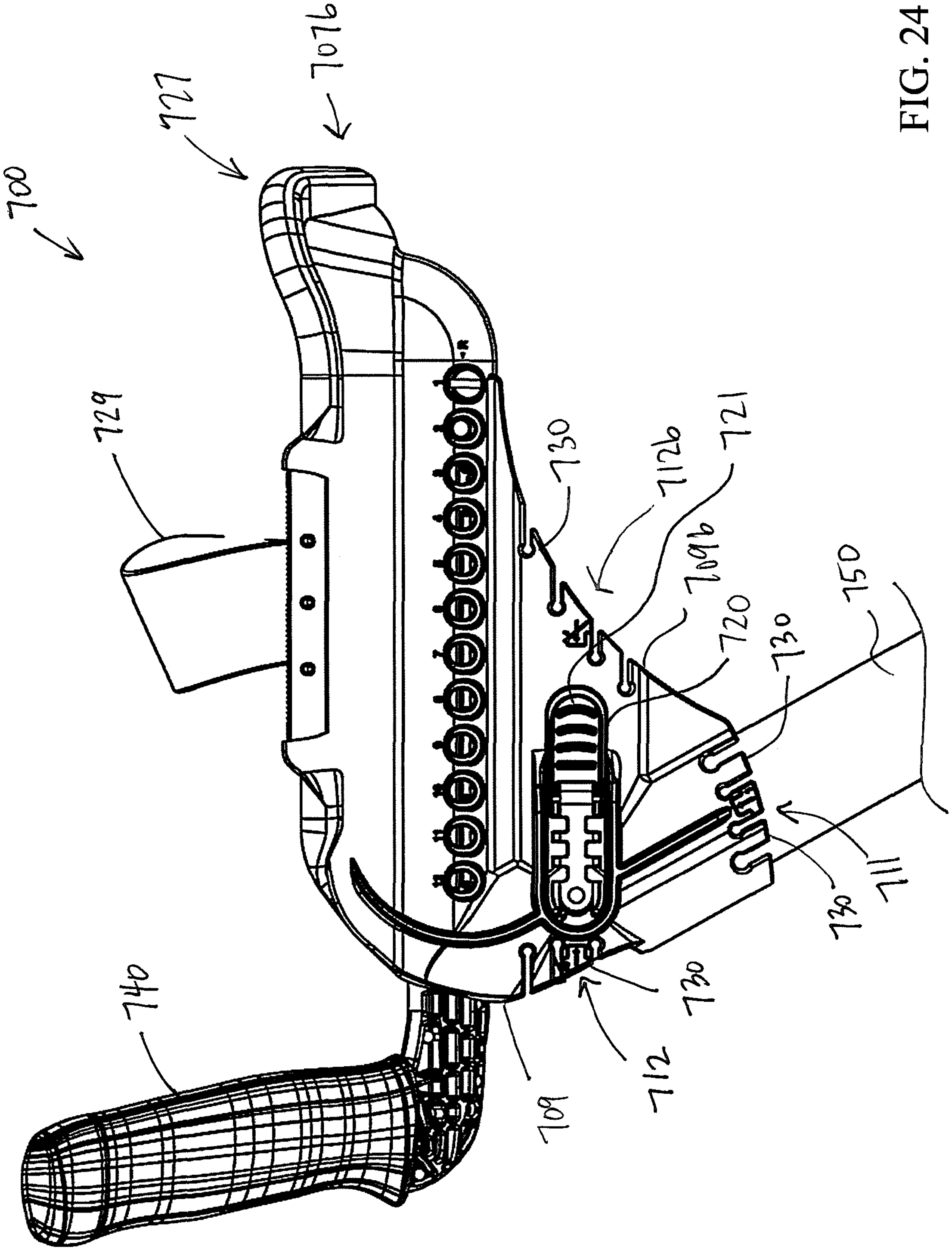
FIG. 24 is a close-up, right side view of the arm rest portion of the crutch of FIG. 21 according to the first configuration.
Figure 25:
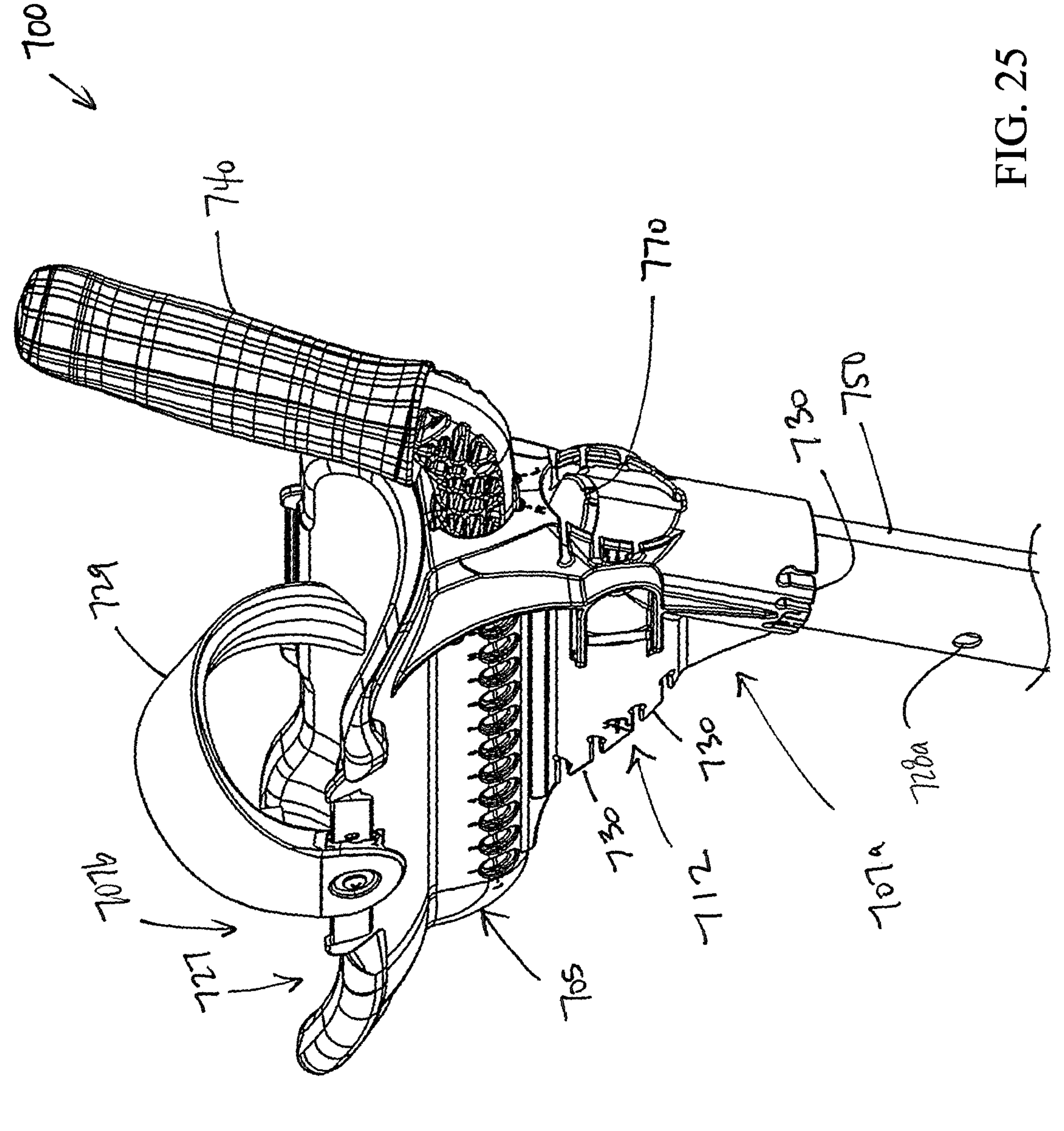
FIG. 25 is a close-up, left side perspective view of the arm rest portion of the crutch of FIG. 21 according to the first configuration.
Figure 28:
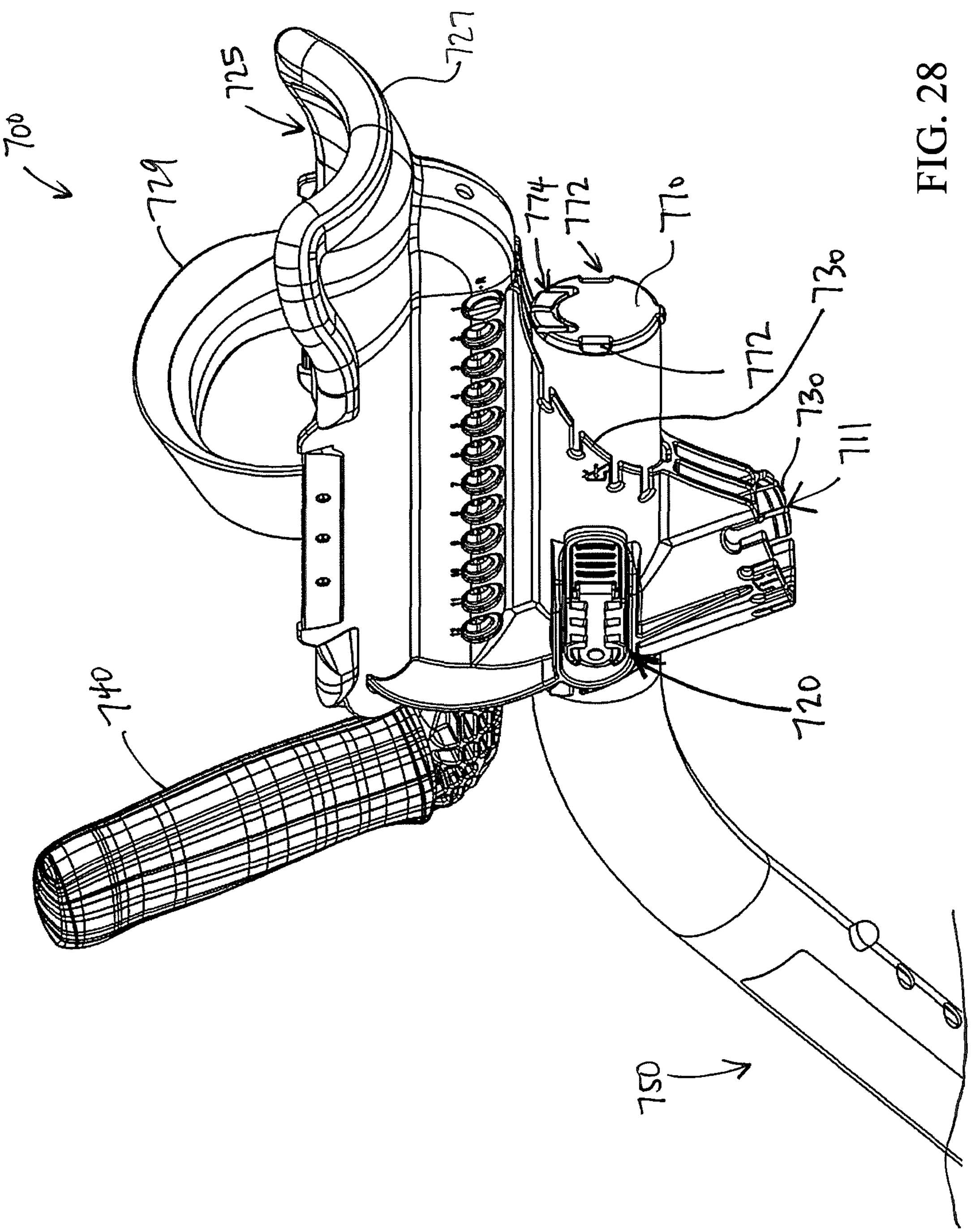
FIG. 28 is a close-up, ride side perspective view of the arm rest portion of the crutch of FIG. 21 according to the second configuration.
Figure 29:
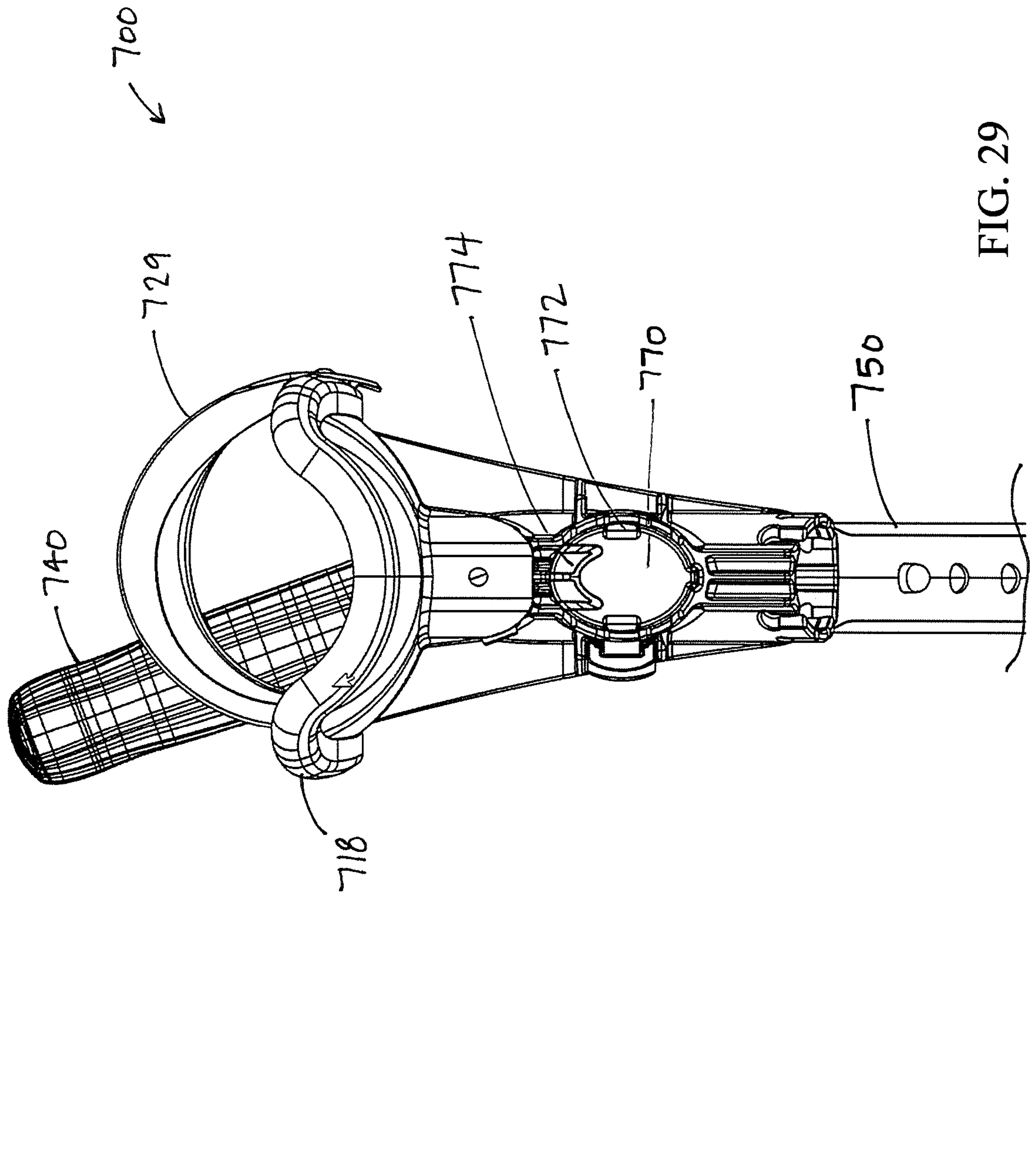
FIG. 29 is a rear view of the arm rest portion of the crutch of FIG. 21 according to the second configuration.

As shown in FIGS. 21-29, a back end 707*b* of the main body 705, comprising the elbow cup 727, may be cut out, e.g., in a half-moon shape. The cutout provides clearance for the user's arm in the event that the user's arm is extended. Accordingly, the user's elbow may be comfortably extended such that the user's arm is straightened while the user's forearm is maintained in position within the cradle 725. As mentioned above, the bracing 729 which extends over the cradle 725, keeps the user's arm in position within the cradle 725. Optionally, the bracing 729 may funnel inward in the direction of the handle 740. The ramp design of the bracing 729 may facilitate a user's easy entry and exit from the crutch 700. The ramp design of the bracing 729 is best illustrated in FIGS. 24, 25, and 28.

Figure 21:
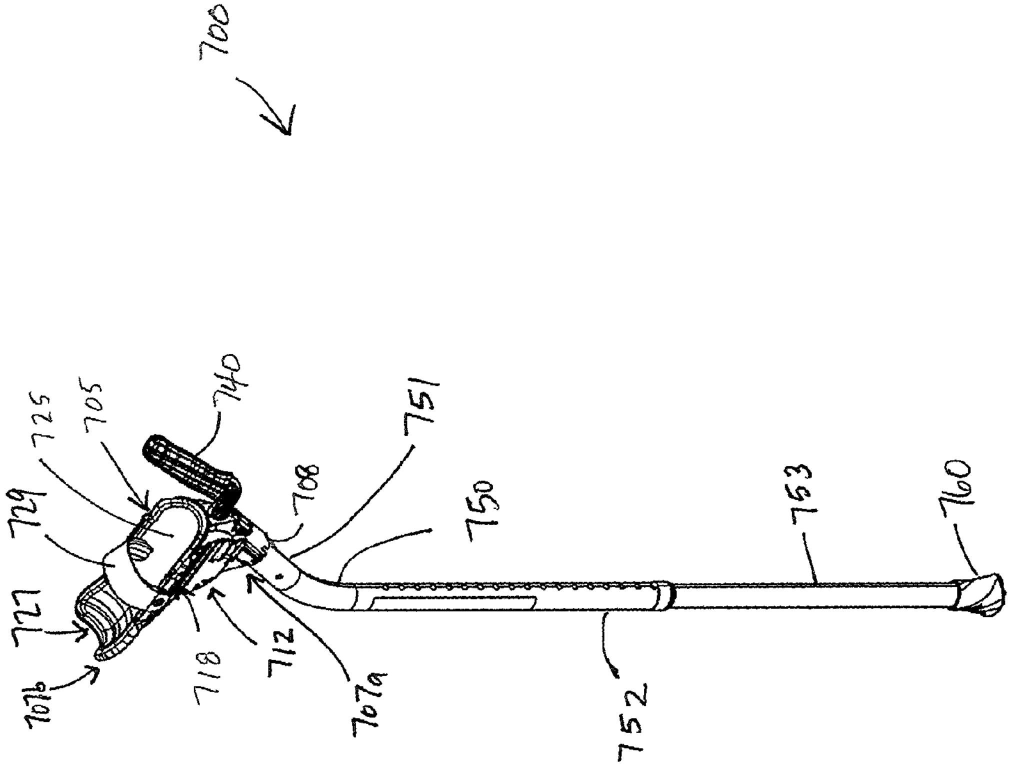
FIG. 21 is a perspective view of a first configuration of a crutch according to still another embodiment of the invention.
Figure 22:
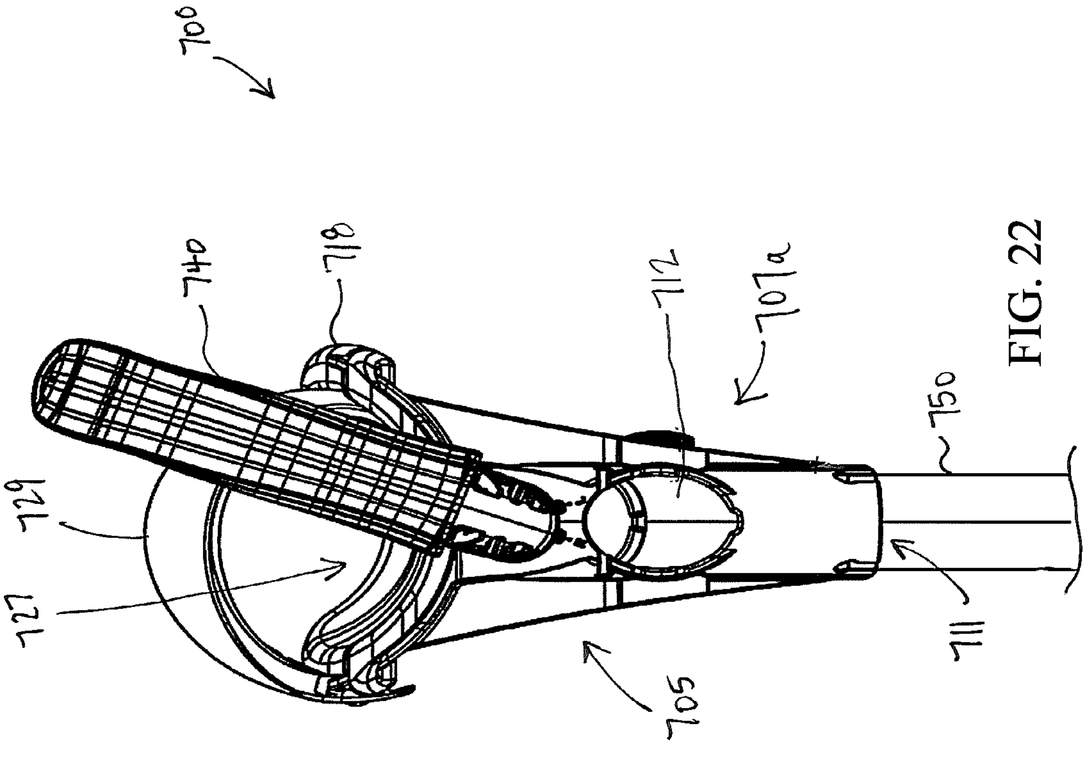
FIG. 22 is a close-up, front view of the arm rest portion of the crutch of FIG. 21 according to the first configuration.
Figure 23:
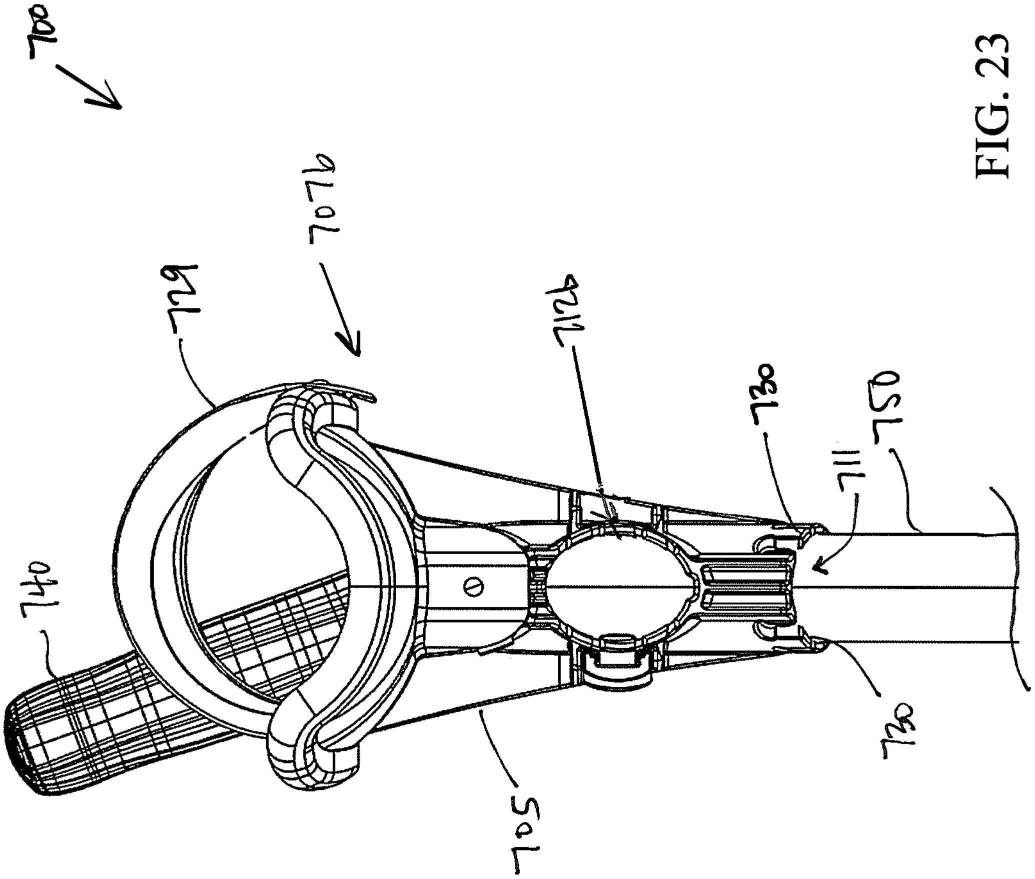
FIG. 23 is a close-up, rear view of the arm rest portion of the crutch of FIG. 21 according to the first configuration.

The leg 750 optionally includes a first angled section 751 and a second vertical section 752, as shown in at least FIG. 21. The first and second sections 751 and 752 may have a unitary configuration (i.e., are integrally formed of a single material). Optionally, the second vertical section 752 is configured to receive a third section 753 which may be, but need not be, separate from the first and second sections 751 and 752 respectively. The third section 753 may include a quick release connector (similar to quick release connector 555). The quick release connector may engage with apertures formed in the second vertical section 752 to lengthen and shorten the crutch 700 as needed by the user.

The first angled section 751 may be angled between about 0 and 90 degrees from vertical. In an embodiment, the angle may be about 45 degrees from vertical. In one embodiment, the angle in the first angled section 751 may be in a front-to-back orientation, as seen in FIG. 21.

As described briefly above, the leg 750 engages with the main body 705 via the openings 711 and 712. In a first configuration, illustrated in FIGS. 21-25, the leg 750 is inserted into the opening 711. Here, the leg 750 is inserted into the opening such that the first angled section 751 is angled toward the handle 740. When the leg 750 is inserted into the opening 711 as described, the main body 705 is substantially parallel to the ground.

Figure 26:
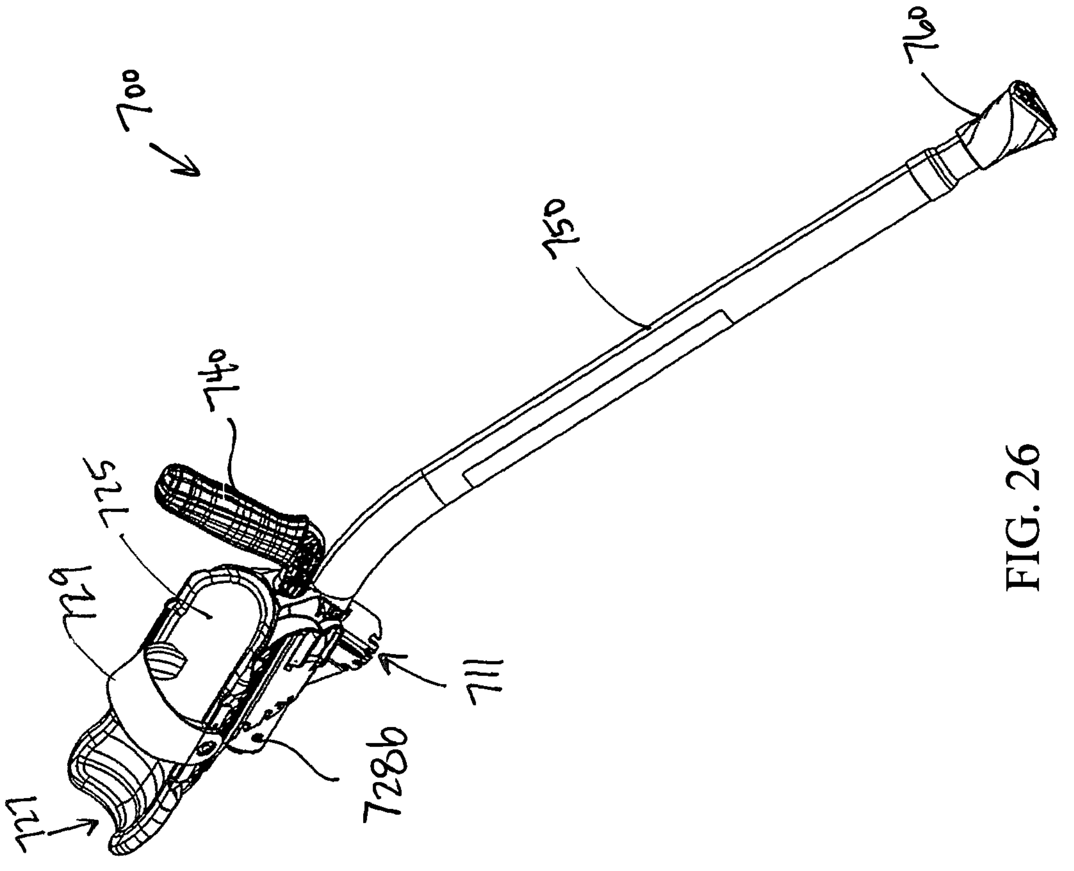
FIG. 26 is a perspective view of a second configuration of the crutch of FIG. 21.
Figure 27:
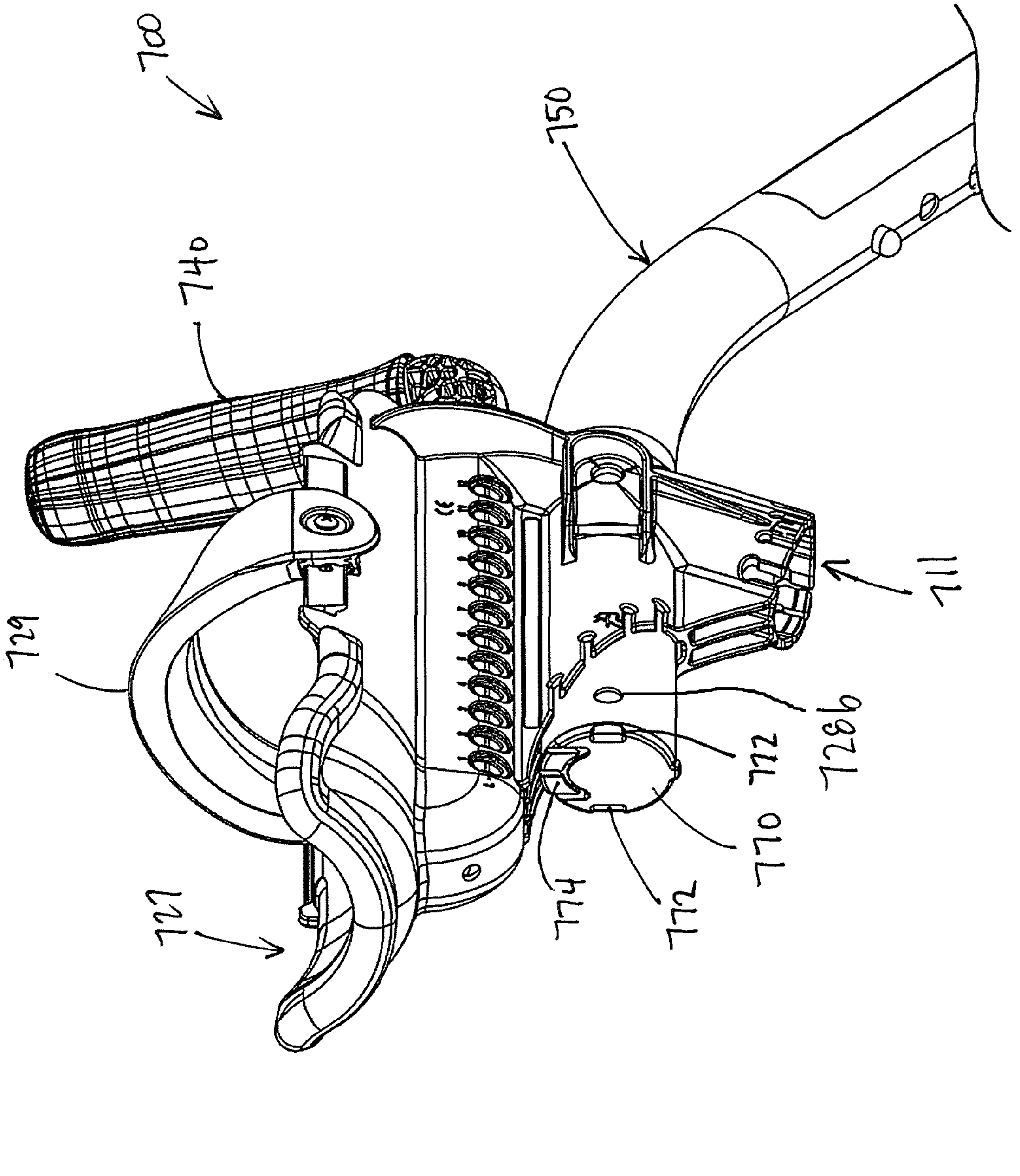
FIG. 27 is a close-up, left side perspective view of the arm rest portion of the crutch of FIG. 21 according to the second configuration.

In a second configuration, illustrated in FIGS. 26-29, the leg 750 is inserted into the opening 712. Here, the leg 750 may be rotated in order to insert it into the opening 712 and through the opening 712*b*, as further described below. When the leg 750 is engaged with the opening 712, the main body 705 is angled downward towards the ground surface, as shown in FIG. 26.

In instances, it may be desirable for the user to switch from the first configuration to the second configuration or vice versa. In order to move from the first configuration to the second configuration, the user may simply remove the leg 750 from the respective opening 711 or 712, position the leg 750 around such that the angle of the leg 750 is appropriate for the desired position of the main body 705, and insert the leg 750 into the other opening 712 or 711. When the user changes the configuration of the crutch 700, the user completely removes the leg 750 from contact with the main body 705. Contact is then reestablished when the leg 750 is reinserted into the desired opening 711 or 712.

To facilitate the connection and disconnection between the leg 750 and the main body 705, the leg 750 may include one or more openings 728*a*, 728*b* to engage with a lever 720 forming part of the main body 705. The lever 720 may include a projection extending toward the main body 705 which may be received into one of the openings 728*a*, 728*b* to the lock the leg 750 into position with the main body 705. To remove the leg 750 from connection with the main body 705, the user may simply press a button 721 of the lever 720, thus rotating the projection out of the opening 728*a* or 728*b*. While the button 721 is pressed, the leg 750 can be removed from connection with the main body 705 and reconfigured as desired. The openings 728*a* and 728*b* may be defined at locations on the leg 750 such that the lever 720 only engages with the respective opening 728*a* or 728*b* when the leg 750 is correctly inserted into the respective opening 711 and 712. For example, one opening (e.g., 728*b*) may be located in a first side of the leg 750 to engage with the lever 720 when the leg 750 is inserted into opening 711. Another opening (e.g., 728*b*) in a second side of the leg 750 (e.g., opposite the first side) may engage with the lever 720 when the leg 750 is inserted into the opening 712. The openings 728*a*, 728*b* in the respective first and second sides of the leg 750 need not be on the same horizontal or vertical plane. Of course, the legs 750 may alternately or additionally be held in position via a frictional fit with the main body 705.

Optionally, the leg 750 is equipped with structure, e.g., a cap 770, for operably interfacing with the openings 711, 712 on the main body 705. The cap 770 is most clearly illustrated in FIGS. 27 and 28. The cap 770 may include one or more ramped portions 772. Further, the cap 770 may be equipped with a flexible portion 774 (e.g., anti-rattles). The ramped portions 772 and the flexible portion 774 may help the leg 750 engage with the main body 705, especially where the outer diameter of the leg 750 is greater than the inner diameter of the openings 711 and 712. In some embodiments, the cap 770 may be specifically configured to mate with a keyed slot within the openings 711 and/or 712 in the main body 705. A leg 750 having a cap 770 with the ramped portions 772 and the flexible portion 774 may only be received into the opening 712 if the leg 750 is correctly positioned. Of course, a keyed slot may also be formed in the opening 711. Accordingly, the cap 770, together with the keyed slot in the main body 705 may assist in ensuring that the leg 750 is correctly inserted into the respective opening 711 or 712.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

What is claimed is:

1. A main body for a crutch, comprising:

an arm rest, comprising a first and a second opening formed therein; the first opening extending along a horizontal axis substantially parallel with the arm rest; and the second opening extending along a generally vertical axis, the generally vertical axis intersecting the horizontal axis;

wherein:

the main body is configured to selectively receive a leg into one of the first and second openings in the arm rest in a first configuration; and the main body is configured to selectively receive the leg into the other of the first and second openings in the arm rest in a second configuration.

2. The main body of claim 1, further comprising a handle extending outwardly from a front end of the arm rest, wherein the handle does not extend from the first or second openings.

3. The main body of claim 1, wherein a rear end of the arm rest comprises an elbow cup for receiving a user's elbow.

4. The main body of claim 3, wherein the elbow cup comprises a cutout.

5. The main body of claim 1, wherein a padding extends at least partially over the arm rest.

6. The main body of claim 1, further comprising at least one brace extending substantially across a width of the arm rest.

7. The main body of claim 1, further comprising a cradle having a first end for receiving an elbow of a user and an open second end.

8. The main body of claim 7, wherein the cradle is hingedly secured to the arm rest.

9. The main body of claim 8, further comprising at least one arm band brace extending substantially across a width of the arm rest.

10. The main body of claim 1, wherein each of the first and second openings in the arm rest comprises a plurality of anti-rattle teeth defined around a perimeter thereof.

11. A main body for a crutch, comprising:

a first section having a tubular opening at a distal end thereof for receiving a leg;

a second section extending from a proximal end of the first section at an angle;

a third section extending substantially horizontally from a proximal end of the second section; and an arm rest support comprising an elbow cup and an open end longitudinally separated from the elbow cup, the arm rest support being configured to support a user's forearm between an elbow and a wrist by extending substantially between the elbow and the wrist at an underside thereof, wherein the elbow cup supports the user's elbow and the open end is generally adjacent the user's wrist when the crutch is in use;

wherein the first, second, and third sections are integrally formed of a single piece of material.

12. The main body of claim 11, further comprising a handle, wherein the handle extends outwardly from the third section of the main body.

13. The main body of claim 11, wherein the arm rest support is configured as a cradle operably secured to the third section.

14. The main body of claim 13, wherein the cradle is hingedly secured to the third section.

15. The main body of claim 13, further comprising at least one arm band extending substantially across the width of the cradle.

16. The main body of claim 13, further comprising padding extending at least partially over the cradle.

17. The main body of claim 11, further comprising at least one arm band extending substantially across a width of the third section.

18. The main body of claim 11, further comprising padding extending at least partially over the third section.

19. A main body for a crutch, comprising:

a first section having a tubular opening at a distal end thereof for receiving a leg;

a second section extending from a proximal end of the first section at an angle;

a third section extending substantially horizontally from a proximal end of the second section; and a cradle hingedly secured to the third section, the cradle having an elbow end and an open end longitudinally spaced apart from the elbow end, the open end being substantially adjacent the proximal end of the second section in a use configuration;

wherein:

the first, second, and third sections are integrally formed of a single piece of material.

20. The main body of claim 19, wherein the open end of the cradle is selectively fastened to the third section.

* * * * *